(12) United States Patent
Morishita

(10) Patent No.: US 10,985,438 B2
(45) Date of Patent: Apr. 20, 2021

(54) VEHICLE WINDOW GLASS

(71) Applicant: Nippon Sheet Glass Company, Limited, Tokyo (JP)

(72) Inventor: Hiromasa Morishita, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/314,510

(22) PCT Filed: Jun. 29, 2017

(86) PCT No.: PCT/JP2017/023985
§ 371 (c)(1),
(2) Date: Mar. 6, 2019

(87) PCT Pub. No.: WO2018/003928
PCT Pub. Date: Jan. 4, 2018

(65) Prior Publication Data
US 2019/0190117 A1    Jun. 20, 2019

(30) Foreign Application Priority Data
Jul. 1, 2016 (JP) .............................. JP2016-132105

(51) Int. Cl.
*H01Q 1/12* (2006.01)
*H01Q 1/32* (2006.01)
(Continued)

(52) U.S. Cl.
CPC .............. *H01Q 1/1278* (2013.01); *B60J 1/00* (2013.01); *B60J 1/002* (2013.01); *B60R 16/03* (2013.01);
(Continued)

(58) Field of Classification Search
CPC ...... H01Q 1/12; H01Q 1/1271; H01Q 1/1278; H01Q 1/1285; H01Q 1/27; H01Q 1/32;
(Continued)

(56) References Cited

U.S. PATENT DOCUMENTS 5,119,106 A * 6/1992 Murakami ........... H01Q 1/1271
343/704
5,654,721 A * 8/1997 Saitou .................. H01Q 1/1271
343/704
(Continued)

FOREIGN PATENT DOCUMENTS

CN        101212077 A       7/2008
CN        102017293 A       4/2011
(Continued)

OTHER PUBLICATIONS

Extended European Search Report dated Mar. 13, 2020, for European Application No. 17820282.6.
(Continued)

*Primary Examiner* — Jason Crawford
(74) *Attorney, Agent, or Firm* — Birch, Stewart, Kolasch & Birch, LLP

(57) ABSTRACT

A vehicle window glass according to the present invention includes a glass plate having a defogger region and an antenna region, a defogger disposed in the defogger region and having a plurality of horizontal heating wires, and an antenna including at least an FM antenna and disposed in the antenna region, the FM antenna including a first power supply part disposed on the glass plate, and an FM antenna body having a first horizontal part, a second horizontal part closer to the defogger than is the first horizontal part and at least one vertical part linking both the horizontal parts, and connected to the first power supply part.

17 Claims, 19 Drawing Sheets

(51) Int. Cl.
*H01Q 5/30* (2015.01)
*H01Q 1/22* (2006.01)
*B60J 1/00* (2006.01)
*B60R 16/03* (2006.01)
*B60S 1/02* (2006.01)
*H05B 3/86* (2006.01)
*B60J 1/18* (2006.01)

(52) U.S. Cl.
CPC ............... *B60S 1/026* (2013.01); *H01Q 1/22* (2013.01); *H01Q 1/32* (2013.01); *H01Q 5/30* (2015.01); *H05B 3/86* (2013.01); *B60J 1/18* (2013.01)

(58) Field of Classification Search
CPC .. H01Q 1/325; H01Q 5/30; B60S 1/02; B60S 1/023; B60S 1/026; B60J 1/002
See application file for complete search history.

(56) References Cited

U.S. PATENT DOCUMENTS

| | | | | | |
|---|---|---|---|---|---|
| 5,905,468 | A | * | 5/1999 | Ikawa | H01Q 1/1278 343/704 |
| 5,952,977 | A | * | 9/1999 | Taniguchi | H01Q 1/1278 343/713 |
| 6,147,654 | A | * | 11/2000 | Nagy | H01Q 1/1278 343/704 |
| 6,229,493 | B1 | * | 5/2001 | Iijima | H01Q 1/1278 343/704 |
| 2004/0056810 | A1 | * | 3/2004 | Oka | H01Q 1/1278 343/713 |
| 2005/0030235 | A1 | * | 2/2005 | Noguchi | H01Q 1/1278 343/713 |
| 2007/0111690 | A1 | * | 5/2007 | Nagy | H01Q 1/1271 455/193.1 |
| 2007/0273597 | A1 | * | 11/2007 | Noda | H01Q 1/1271 343/713 |
| 2008/0106480 | A1 | * | 5/2008 | Nagayama | H01Q 21/30 343/713 |
| 2008/0158073 | A1 | * | 7/2008 | Ibe | H01Q 1/1271 343/713 |
| 2010/0097278 | A1 | * | 4/2010 | Kubota | H01Q 1/1278 343/713 |
| 2011/0032163 | A1 | * | 2/2011 | Noguchi | H01Q 1/1271 343/711 |
| 2011/0043419 | A1 | * | 2/2011 | Noguchi | H01Q 1/1278 343/712 |
| 2011/0115681 | A1 | * | 5/2011 | Oshima | H01Q 1/1278 343/713 |
| 2012/0038527 | A1 | * | 2/2012 | Tanaka | H01Q 5/40 343/713 |
| 2012/0249382 | A1 | * | 10/2012 | Tadokoro | H01Q 1/1271 343/713 |
| 2018/0123219 | A1 | * | 5/2018 | Doi | H01Q 1/02 |

FOREIGN PATENT DOCUMENTS

| | | |
|---|---|---|
| CN | 102067379 A | 5/2011 |
| CN | 102668239 A | 9/2012 |
| EP | 1 939 978 A1 | 7/2008 |
| EP | 2299538 A1 | 3/2011 |
| JP | 9-181514 A | 7/1997 |
| JP | 2006-033050 A | 2/2006 |
| JP | 2008-182682 A | 8/2008 |
| JP | 2009-164678 A | 7/2009 |
| JP | 2009-253677 A | 10/2009 |
| JP | 2010-011005 A | 1/2010 |
| JP | 2011-109399 A | 6/2011 |

OTHER PUBLICATIONS

International Search Report for PCT/JP2017/023985 (PCT/ISA/210) dated Sep. 19, 2017.
Written Opinion of the International Searching Authority for PCT/JP2017/023985 (PCT/ISA/237) dated Sep. 19, 2017.
Chinese Office Action and Search Report, dated Jul. 3, 2020 for Chinese Application No. 201780041019.2, along with English translation of the Chinese Office Action.
Japanese Office Action, dated Nov. 17, 2020, for Japanese Application No. 2018-525266, with an English translation.

* cited by examiner

Fig. 8
(a)
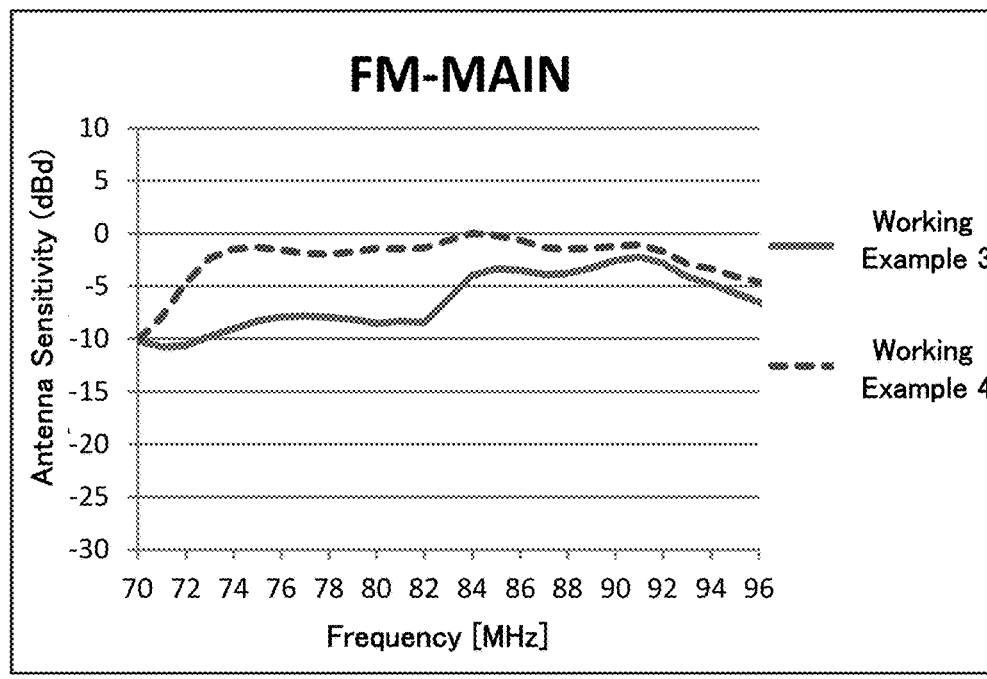
(b)
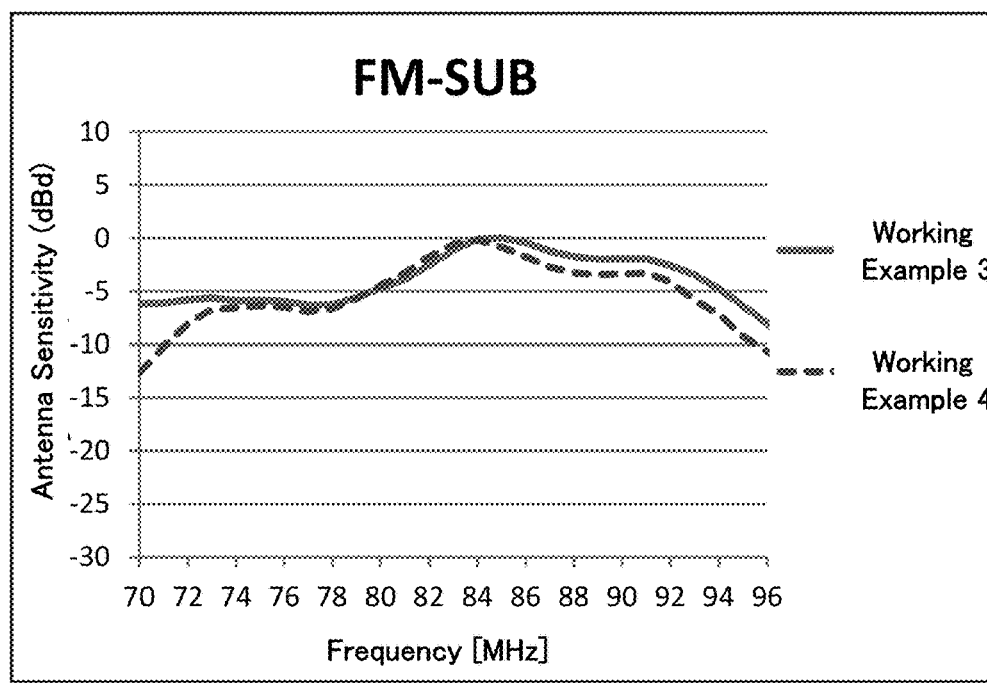

Fig. 9
(a) 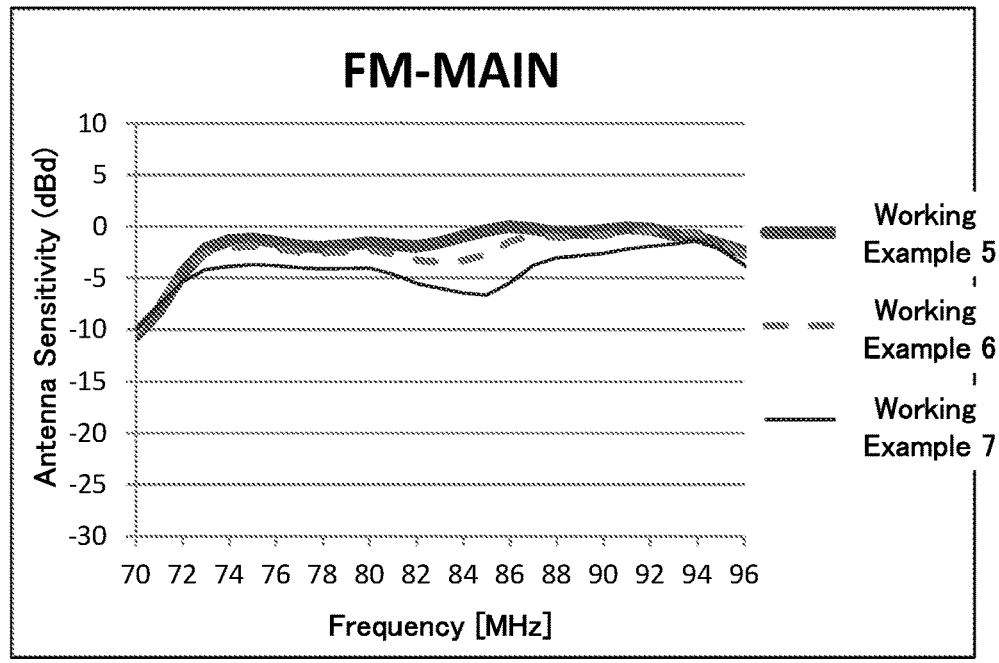
(b) 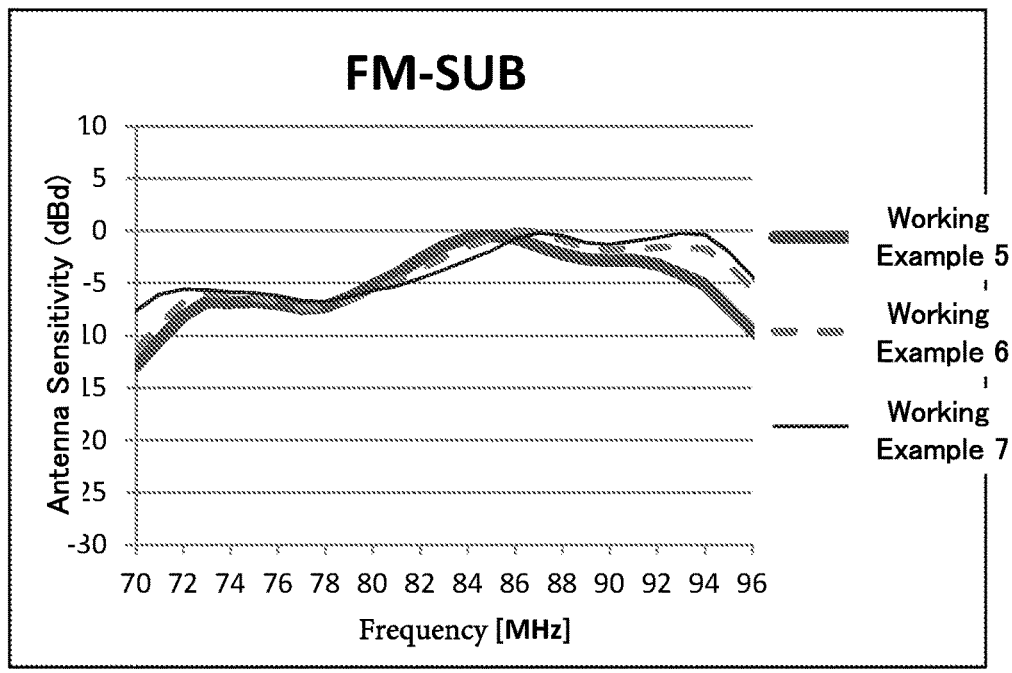

Fig. 10
(a)
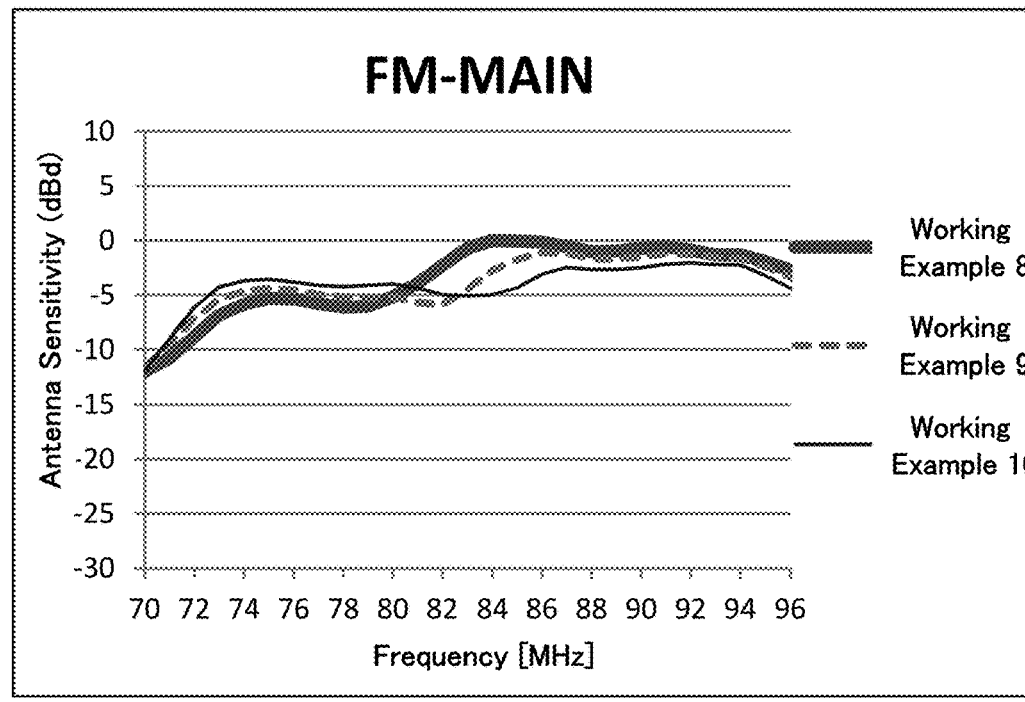
(b)
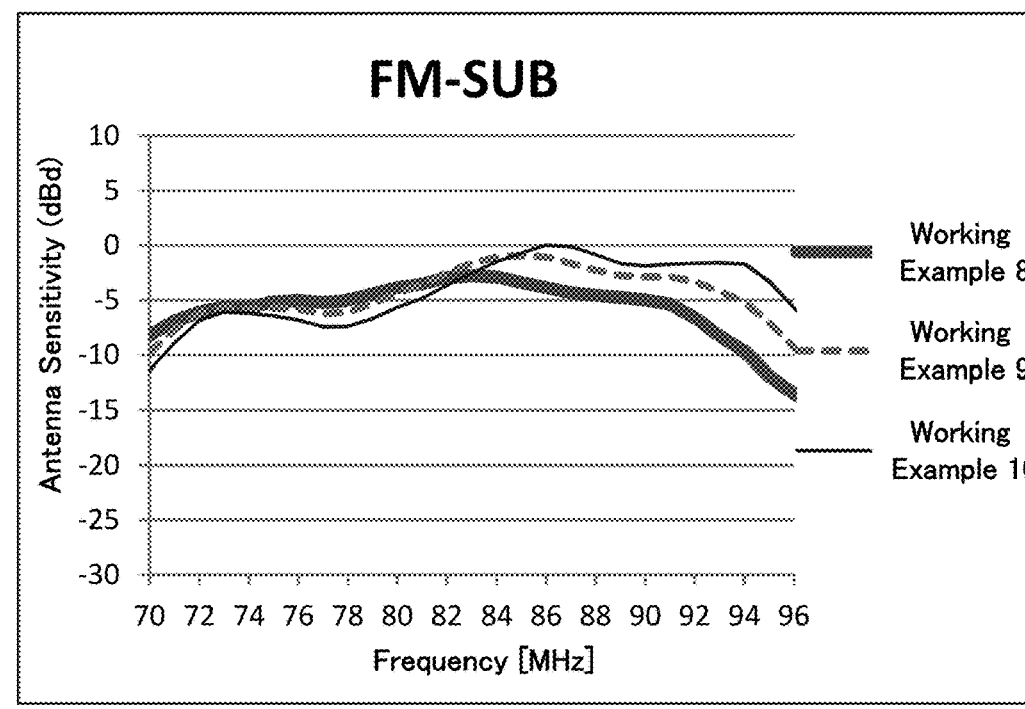

Fig.19
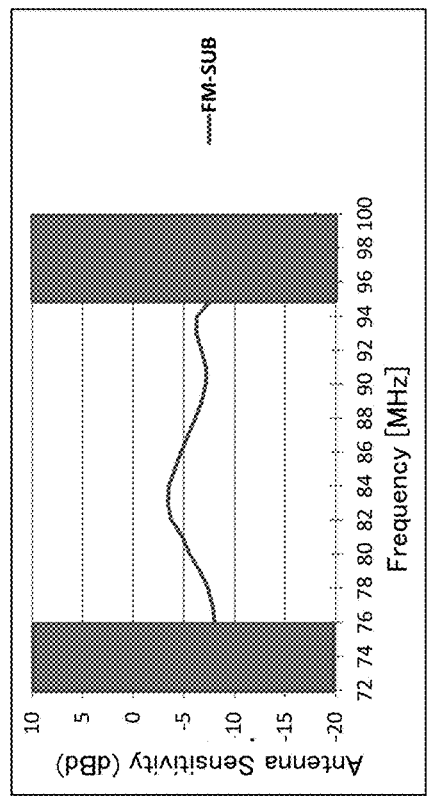
(a)
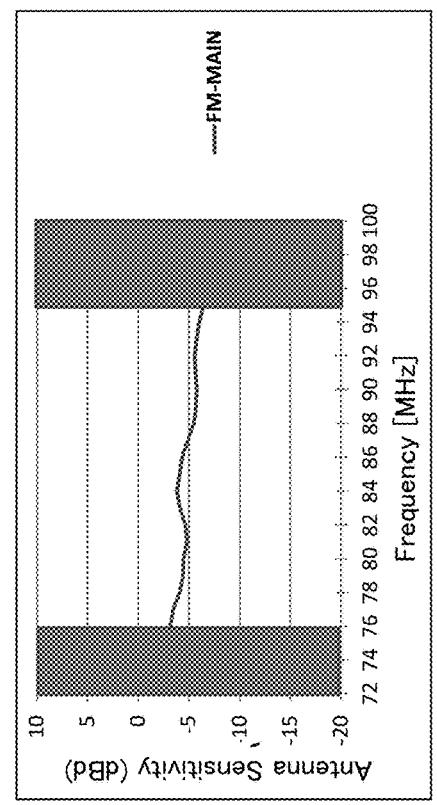
(b)

VEHICLE WINDOW GLASS

TECHNICAL FIELD

The present invention relates to a vehicle window glass.

BACKGROUND ART

Various antennas are provided on the surface of window glass for vehicles (particularly the rear glass) that is installed in an automobile. For example, antennas for receiving broadcasting of various types of media, such as FM broadcasting, AM broadcasting, digital television broadcasting and DAB (Digital Audio Broadcasting; hereinafter, "DAB"), are provided. For example, in Patent Literature 1, antennas for receiving FM broadcasting, AM broadcasting and digital television broadcasting are provided.

CITATION LIST

Patent Literature

Patent Literature 1: JP 2010-11005A

SUMMARY OF INVENTION

Technical Problem

However, generally, a defogger for removing fog is disposed on the rear glass in addition to the antennas, and thus space for disposing the antennas is limited. Also, broadcasting of the abovementioned media essentially requires the provision of separate antennas, and sharing is not possible with some exceptions. Accordingly, a method for efficiently disposing multiple types of antennas on a vehicle window glass was desired. The present invention was made in order to solve the above problem, and an object of the invention is to provide a vehicle window glass on which multiple types of antennas can be efficiently mounted.

Solution to Problem

A vehicle window glass according to the present invention includes a glass plate having a defogger region and an antenna region, a defogger disposed in the defogger region and having a plurality of horizontal heating wires, and an antenna including at least an FM antenna and disposed in the antenna region, the FM antenna including a first power supply part disposed on the glass plate, and an FM antenna body having a first horizontal part, a second horizontal part closer to the defogger than is the first horizontal part and at least one vertical part linking both the horizontal parts, and connected to the first power supply part.

In the above vehicle window glass, the FM antenna can be provided with a first main power supply element that connects the second horizontal part of the FM antenna body to the first power supply part.

In the above vehicle window glass, the FM antenna can be further provided with a first adjustment element that extends from the first power supply part and is capacitively coupled to the first horizontal part of the FM antenna body.

In the above vehicle window glass, the FM antenna can be further provided with a first adjustment element that extends from the first power supply part and is capacitively coupled to the first horizontal part of the FM antenna body and a second main power supply element that connects the second horizontal part of the FM antenna body to the first adjustment element.

In the above vehicle window glass, the FM antenna can be further provided with a second power supply part and a sub power supply element that extends from the second power supply part and is capacitively coupled to the FM antenna body.

In the above vehicle window glass, the sub power supply element can be capacitively coupled to the first horizontal part of the FM antenna body.

In the above vehicle window glass, the first power supply part can be disposed at one end portion of the glass plate in the horizontal direction, and the second power supply part can be disposed at the other end portion.

In the above vehicle window glass, the distance between the FM antenna body and the defogger can be 50 mm or less.

In the above vehicle window glass, the FM antenna can be configured so as to be shared with an AM antenna to which power is supplied from the first power supply part.

In the above vehicle window glass, the antenna region can be provided with a television antenna region on both sides of the first horizontal part of the FM antenna body, and the vehicle window glass can be further provided with a pair of digital television antennas that are respectively disposed in the pair of television antenna regions.

In the above vehicle window glass, the distance between the digital television antennas and the defogger can be 50 mm or more.

In the above vehicle window glass, each of the digital television antennas can have a plurality of horizontal parts that extend in parallel with each other in the horizontal direction.

In the above vehicle window glass, the plurality of horizontal parts can differ in length.

In the above vehicle window glass, the FM antenna can be further provided with a second power supply part and a sub power supply element that extends from the second power supply part, and the FM antenna can be provided with at least one third main power supply element that connects the vertical part of the FM antenna body to the first power supply part.

In the above vehicle window glass, the sub power supply element can be capacitively coupled to the second horizontal part of the FM antenna body.

In the above vehicle window glass, the FM antenna can be further provided with a second adjustment element disposed on the opposite side to the second horizontal part of the FM antenna body with the defogger sandwiched therebetween.

In the above vehicle window glass, the second adjustment element can have a first horizontal part that extends in parallel with the horizontal heating wires of the defogger, a second horizontal part disposed in a position further from the defogger than is the first horizontal part, and at least one vertical part that links both the horizontal parts.

In the above vehicle window glass, the FM antenna can be further provided with a second power supply part and a sub power supply element that extends from the second power supply part, the second power supply part can be can disposed on the opposite side to the first power supply part with the defogger sandwiched therebetween, and the sub power supply element can be disposed on the opposite side to the FM antenna body with the defogger sandwiched therebetween and can be capacitively coupled to the defogger.

In the above vehicle window glass, an end portion of the first horizontal part on the opposite side to the first power supply part can be connected to an end portion of the vertical part in the FM antenna body.

Advantageous Effects of Invention

With a vehicle window glass according to the present invention, it is possible to efficiently mount multiple types of antennas.

BRIEF DESCRIPTION OF DRAWINGS

FIG. 8 are graphs showing the relationship between frequency and antenna sensitivity in working examples 3 and 4 (FM main antenna (a), FM sub-antenna (b)).

FIG. 9 are graphs showing the relationship between frequency and antenna sensitivity in working examples 5 to 7 (FM main antenna (a), FM sub-antenna (b)).

FIG. 10 are graphs showing the relationship between frequency and antenna sensitivity in working examples 8 to 10 (FM main antenna (a), FM sub-antenna (b)).

FIG. 19 are graphs showing the relationship between frequency and antenna sensitivity in working example 19 (FM main antenna (a), FM sub-antenna (b)).

DESCRIPTION OF EMBODIMENTS

A. First Embodiment

Figure 1:
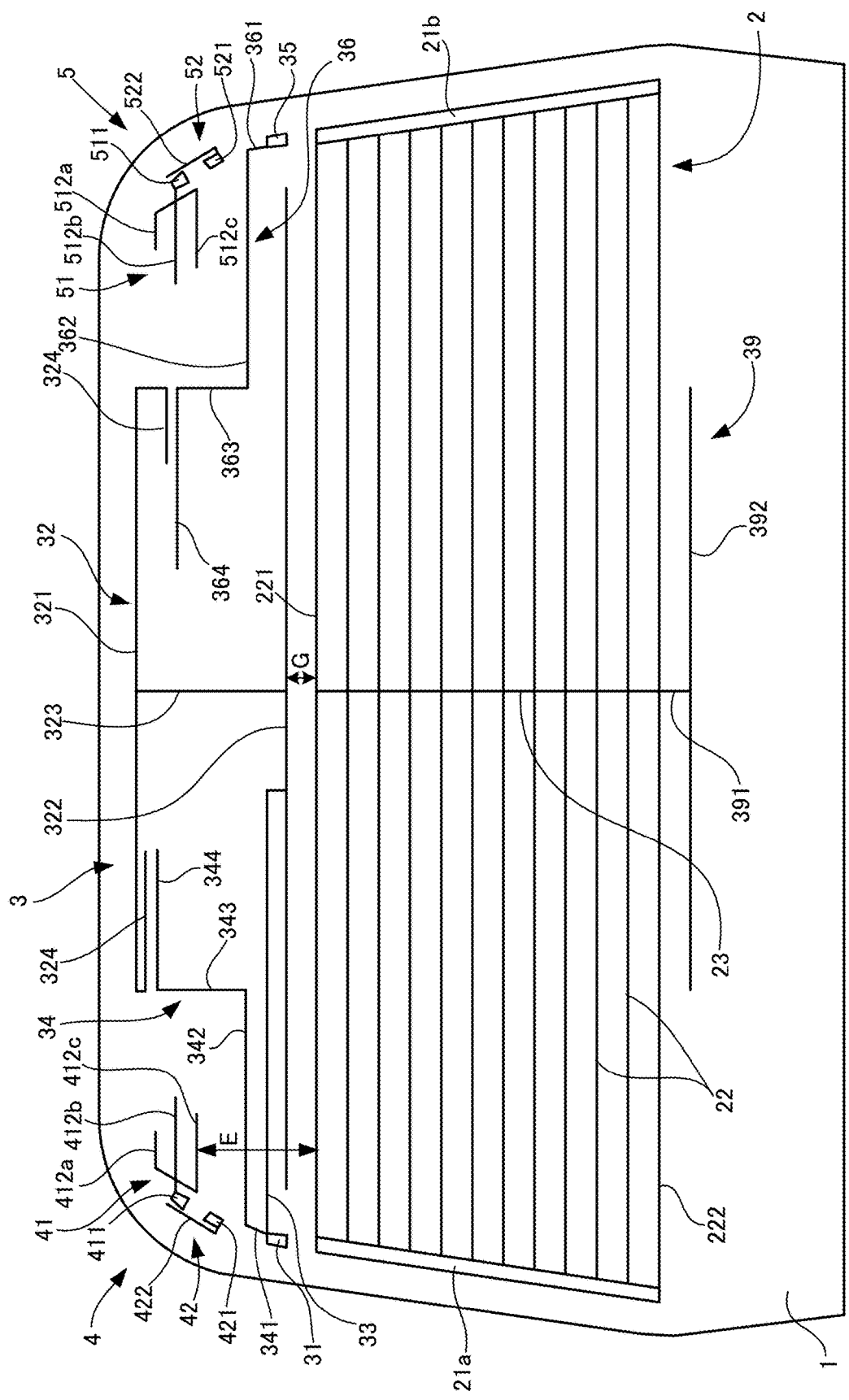
FIG. 1 is a front view of a rear glass of an automobile serving as a first embodiment of a vehicle window glass according to the present invention.

Hereinafter, an embodiment of a vehicle window glass according to the present invention will be described, with reference to the drawings. FIG. 1 is a front view of a rear glass of an automobile to which the vehicle window glass according to the present embodiment is applied. Note that, hereinafter, for convenience of description, the up-down direction in FIG. 1 may be referred to as the up-down direction or the vertical direction, and the left-right direction in FIG. 1 may be referred to as the left-right direction or the horizontal direction, based on the orientation of FIG. 1, but this orientation is not intended to limit the invention.

1. Vehicle Window Glass

As shown in FIG. 1, the vehicle window glass according to the present embodiment has a glass plate 1 on which are mounted a defogger 2, an FM/AM dual band antenna 3, and a pair of digital television antennas 4 and 5. Hereinafter, these members will be described in order.

1-1. Glass Plate

A well-known glass plate for automobiles can be utilized for the glass plate 1. For example, heat absorbing glass, common clear glass, common green glass or UV green glass may be utilized as the glass plate 1. Such a glass plate 1 needs, however, to realize a visible light transmittance in line with safety standards of the country in which the automobile is used. For example, solar absorbance, visible light transmittance and other characteristics can be adjusted to satisfy safety standards. Below, an example of the composition of clear glass and an example of the composition of heat absorbing glass are shown.

Clear Glass $SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkaline metal)
Total iron oxide in terms of $Fe_2O_3$ (T-$Fe_2O_3$): 0.08 to 0.14 mass %

Heat Absorbing Glass

The composition of heat absorbing glass can, for example, be given as a composition including total iron oxide in terms of $Fe_2O_3$ (T-$Fe_2O_3$) at a ratio of 0.4 to 1.3 mass %, $CeO_2$ at a ratio of 0 to 2 mass %, and $TiO_2$ at a ratio of 0 to 0.5 mass %, based on the composition of clear glass, and in which the skeletal component (mainly $SiO_2$ or $Al_2O_3$) of the glass is reduced by an amount equivalent to the increase in T-$Fe_2O_3$, $CeO_2$ and $TiO_2$.

Note that the type of glass plate 1 is not limited to clear glass or heat absorbing glass, and is selectable as appropriate for the embodiment. For example, the glass plate 1 may be a resin window made of acrylic resin, polycarbonate resin or the like.

Also, such a glass plate 1, apart from being constituted by a single glass plate, may be a laminated glass in which an intermediate film such as a resin film is sandwiched by a plurality of sheets of glass.

1-2. Defogger

Next, the defogger 2 will be described. As shown in FIG. 1, the defogger 2 is disposed in the vicinity of the middle of the glass plate 1 in the up-down direction (defogger region), and is formed so as to extend across the entirety of the glass plate 1 in the left-right direction. Specifically, this defogger 2 includes a pair of bus bars 21a and 21b for power supply that extend in the up-down direction along both side edges of the glass plate 1. Between both of the bus bars 21a and 21b, a plurality of horizontal heating wires 22 are disposed in parallel at a predetermined interval, and heat for defogging is generated by power supply from the bus bars 21a and 21b. Also, in this defogger 2, a vertical wire 23 that extends in the up-down direction is provided so as to generally divide these horizontal heating wires 22 equally in two in the horizontal direction. Also, the vertical wire 23 extends so as to join the horizontal heating wire that is uppermost (hereinafter, uppermost horizontal heating wire 221) with the horizontal heating wire that is lowermost (hereinafter, lowermost horizontal heating wire 222), but acts to assist the FM/AM dual band antenna 3 described later, rather than having a function of heating the glass plate 1.

1-3. FM/AM Dual Band Antenna

Next, the FM/AM dual band antenna 3 will be described. This FM/AM dual band antenna 3 is disposed on the glass plate 1 in an antenna region that is upward of the defogger 2. Specifically, this FM/AM dual band antenna 3 is provided with a first power supply part 31 disposed directly above the defogger 2 on the left end side of the antenna region, an FM antenna body 32 that is disposed in the middle of the antenna region, a first main power supply element 33 that connects the first power supply part 31 to the FM antenna body 32, and a first adjustment element 34 that extends upward from the first power supply part 31. An FM main antenna is thereby constituted. Furthermore, a second power supply part 35 disposed directly above the defogger 2 and a sub power supply element 36 that extends upward from this second power supply part 35 are provided on the right end side of the antenna region as an FM sub-antenna. Furthermore, a second adjustment element 39 is provided on the lower side of the defogger 2. Hereinafter, these elements constituting the FM/AM dual band antenna will be described in detail.

The FM antenna body 32 has a first horizontal part 321 that extends right and left along the vicinity of the upper edge of the glass plate 1, a second horizontal part 322 that extends in parallel with this first horizontal part 321 and in parallel with the uppermost horizontal heating wire 221 of the defogger 2, and a vertical part 323 that joins the middle of the first horizontal part 321 to the middle of the second horizontal part 322 and extends in the up-down direction. The second horizontal part 322 is provided to span substantially the entire distance between the power supply parts 31 and 35, but the first horizontal part 321 is shorter and has a length that is generally half of the second horizontal part 322. A television antenna region described later is thereby secured on both sides of the first horizontal part 321. Also, on both side portions of the first horizontal part 321, a short turned back part 324 that is turned back on the lower side and extends in parallel with the first horizontal part 321 is provided. Note that the sensitivity of the FM antenna increases as the first horizontal part 321 is disposed in a position closer to the upper edge of the glass plate 1, as will be described later.

A distance G between the second horizontal part 322 and the uppermost horizontal heating wire 221 of the defogger 2 is 50 mm or less. To facilitate capacitive coupling of the FM antenna 3 and the defogger 2, this distance G is preferably 45 mm or less, and more preferably 40 mm or less. Since the FM antenna 3 according to the present embodiment is, however, also for dual use as an AM antenna, the distance G is preferably 30 mm or more, since AM reception performance decreases when the antenna is too close to the defogger 2.

Also, the vertical part 323 is disposed so as to extend in the up-down direction in the vicinity of the middle of the glass plate 1, in correspondence with the abovementioned vertical wire 23 of the defogger 2. The vertical parts 323 and 23 thereby resonate, and the sensitivity of the FM antenna can be improved.

Next, the first main power supply element 33 will be described. This first main power supply element 33 is formed in an L-shape, so as to extend on the right side from the first power supply part 31 along the upper side of the second horizontal part 322 of the FM antenna body 32 and, furthermore, to bend on the lower side at the left side of the vertical part 323 and be connected to the second horizontal part 322. Accordingly, this first main power supply element 33 is directly connected to the FM antenna body 32.

Next, the first adjustment element 34 will be described. This first adjustment element 34 is provided with a first vertical part 341 that extends upward from the first power supply part 31, a first horizontal part 342 that extends on the right side from this first vertical part 341, a second vertical part 343 that extends upward from the right end portion of the first horizontal part 342, and a second horizontal part 344 that extends toward the right side from the upper end of this second vertical part 343. The first vertical part 341 is short in length, and extends to the upper side of the first power supply element 33. The first horizontal part 342 is approximately half the length of the first power supply element 33, and extends to a position corresponding to the left end portion of the first horizontal part 321 of the FM antenna body 32. The second vertical part 343 extends to downward of the left end portion of the first horizontal part 321 of the FM antenna body 32, and the second horizontal part 344 is adjacent to the lower side of the first horizontal part 321 of the FM antenna body 32, and is formed in parallel with the turned back part 324 at substantially the same length as the turned back part 324.

Here, the optimal value of the length of the turned back part 324 and the second horizontal part 344 and the optimal value of the distance between the turned back part 324 and the second horizontal part 344 change depending on the impedance of the design value of the FM antenna 3, and in the case where the impedance of the design value is 75Ω, for example, the turned back part 324 and the second horizontal part 344 can be set as follows. That is, the optimal value of the length of the turned back part 324 and the second horizontal part 344 is preferably 50 mm to 250 mm, more preferably 100 mm to 200 mm, and particularly preferably 120 mm to 160 mm. Also, the optimal value of the distance between the turned back part 324 and the second horizontal part 344 is preferably 5 mm to 30 mm, more preferably 5 mm to 20 mm, and particularly preferably 7 mm to 12 mm.

As a result of a configuration such as the above, the region that is surrounded by the first horizontal part 342 and the second vertical part 343 of the first adjustment element 34 in the upper left of the glass plate 1 constitutes the abovementioned television antenna region.

Next, the sub power supply element 36 will be described. This sub power supply element 36 is provided with a first vertical part 361 that extends upward from the second power supply part 35, a first horizontal part 362 that extends on the left side from this first vertical part 361, a second vertical part 363 that extends upward from the left end portion of the first horizontal part 362, and a second horizontal part 364 that extends toward the left side from the upper end of this second vertical part 363. The first vertical part 361 is short in length, and is substantially the same length as the first vertical part 341 of the first adjustment element 34. The first horizontal part 362 is substantially the same length as the first horizontal part 342 of the first adjustment element 34, and extends to a position corresponding to the right end portion of the first horizontal part 321 of the FM antenna body 32. The second vertical part 363 extends to downward of the right end portion of the first horizontal part 321 of the FM antenna body 32, and the second horizontal part 364 is adjacent to the lower side of the first horizontal part 321 of the FM antenna body 32, is in parallel with the turned back part 324 and slightly longer than the turned back part 324, and is adjacent to the vertical part 323 of the FM antenna body 32.

As a result of such a configuration, the region that is surrounded by the first horizontal part 362 and the second vertical part 363 of the sub power supply element 36 in the upper right of the glass plate 1 constitutes the abovementioned television antenna region.

The above FM antenna 3 is also used as an AM antenna, and the first power supply part 31 is connected to an FM and AM tuner (illustration omitted) via a lead wire or the like. An amplifier may be inserted upstream of the tuner.

Next, the second adjustment element 39 will be described. The second adjustment element 39 is provided with a vertical part 391 that extends downward from the lower end portion of the vertical wire 23 of the defogger 2 and a horizontal part 392 that is linked to the lower end portion of this vertical part 391 and extends in the left-right direction.

1-4. Digital Television Antennas

Next, the digital television antennas will be described. Here, for convenience of description, the left side will be referred to as a first digital television antenna 4, and right side will be referred to as a second digital television antenna 5. As described above, these digital television antennas 4 and 5 are respectively disposed in the television antenna regions on both sides of the FM antenna body 32, and since the digital television antennas are the same apart from being symmetrical in shape, hereinafter the first digital television antenna 4 will be described.

The first digital television antenna 4 is constituted by an antenna body element 41 and a ground connection element 42. The antenna body element 41 has a television power supply part 411 disposed on the upper left of the glass plate 1, and three horizontal parts 412a to 412c that branch in three from this power supply part 411, and extend toward the right side. The three horizontal parts 412a to 412c extend in parallel with each other so as to be arranged side by side in the up-down direction, and are formed at different lengths. In this example, the middle horizontal part 412b is the longest, and the upper horizontal part 412a is the shortest. By providing such horizontal parts 412a to 412c having different lengths, lengths preferable for reception of high frequency and low frequency digital television broadcast waves can be supported, for example. On the other hand, the ground connection element 42 is provided with a ground terminal area 421 disposed on the lower side of the first television power supply part 411, and a ground body 422 that extends upward from this ground terminal area 421 to the left side of the first television power supply part 411.

Also, a distance E between the lowermost side of this first digital television antenna 4 (here, lowermost horizontal part 412c of the antenna body element 41) and the defogger 2 is preferably 50 mm or more, and more preferably 70 mm or more. This is because the broadcast waves of digital television are horizontally polarized waves, and thus sensitivity decreases when the antenna is disposed close to the defogger 2 including a large number of horizontal heating wires 22.

Also, a digital television receiver (illustration omitted) is provided in the automobile, and the television power supply part 411 is connected to an inner conductor of a coaxial cable (illustration omitted) connected to this receiver. On the other hand, the ground terminal area 421 is electrically connected to an outer conductor of the coaxial cable and is grounded.

1-5. Material

A defogger 2 and antennas 3 to 5 such as described above are constituted by combining wire rods, but can be formed by laminating a conductive material having conductivity on the surface of the glass plate 1 so as to have a predetermined pattern. Such a material need only have conductivity, and is selectable as appropriate for the embodiment, with silver, gold, platinum and the like given as examples. Specifically, these members can be formed by, for example, printing and baking a conductive silver paste containing silver powder, glass frit and the like on the surface of the glass plate 1.

1-6. Manufacturing Method

Next, a manufacturing method of the window glass according to the present embodiment will be described. The glass plate 1 of the window glass according to the present embodiment can be shaped by methods such as a press-molding method for shaping the glass plate 1 with a press or a self-weight bending method for bending the glass plate 1 under its own weight.

Here, at the time of shaping the glass plate 1 with these respective methods, the glass plate 1 is heated to a vicinity of the softening point in a heating furnace. Before being placed in this heating furnace, the glass plate 1 is flat in shape, and a paste for the various materials described above, such as a silver paste, for example, is printed on the surface of this glass plate 1. Then, by placing the glass plate 1 in the heating furnace, the glass plate 1 is shaped and the silver paste printed on the glass plate 1 is baked to form the defogger 2 and the antennas 3 to 5.

2. Features

According to the present embodiment as described above, the following effects can be obtained.

(1) Since the FM antenna body 32 is constituted by two horizontal parts 321 and 322 and one vertical part 323 that links these horizontal parts, the antenna region can be used effectively. For example, since the vertical part 323 is provided in a position corresponding to the vertical wire 23 of the defogger 2, and the second horizontal part 322 is provided in a position adjacent to the uppermost horizontal heating wire 221 of the defogger 2, the FM antenna body 32 and the defogger 2 can be effectively capacitively coupled. As a result, the range for receiving FM broadcast waves can be expanded. Note that two or more vertical parts 323 may be provided.

(2) Since the FM antenna body 32 has the two horizontal parts 321 and 322, the power supply parts can be efficiently connected to either of the horizontal parts 321 and 322, even when disposed on the side portion of the glass plate 1.

(3) Since the first horizontal part 321 of the FM antenna body 32 is formed at a short length compared with the second horizontal part 322, space can be formed on both sides thereof. Accordingly, since the digital television antennas 4 and 5 can be disposed in this space, the antenna region can be effectively utilized.

Figure 2:
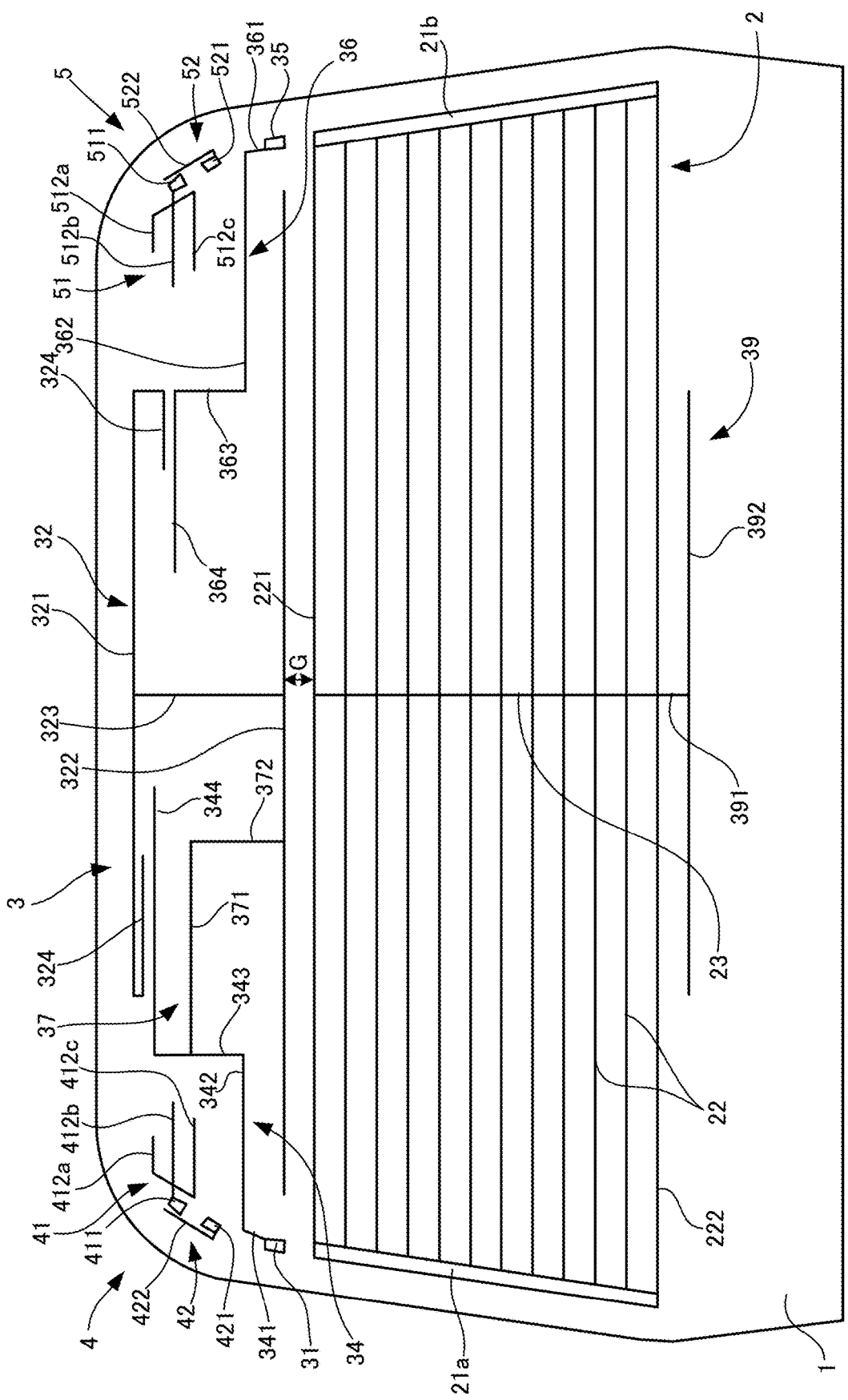
FIG. 2 is a front view of a rear glass showing another example of FIG. 1.

(4) Since the first adjustment element 34 is provided, the impedance of the FM antenna 3 can be adjusted to the impedance (e.g., 75Ω) of the design value. The receiver sensitivity of FM broadcast waves can thereby be improved. Note that the first adjustment element 34 is not particularly limited in shape, and need only extend from the first power supply part 31 and be capacitively coupled to one of the parts of the FM antenna body 32. For example, as shown in FIG. 2, the first adjustment element 34 can also be configured as an element that supplies power to the FM antenna body 32. That is, as shown in FIG. 2, in this example, a first main power supply element is not provided. The first horizontal part 342 of the first adjustment element 34 is shortened, and the second horizontal part 344 is lengthened on the left side. Also, a second main power supply element 37 is connected to the first adjustment element 34, instead of the first main power supply element 33. This second main power supply element 37 is formed in an L-shape provided with a horizontal part 371 that extends in the right direction from the second vertical part 343 of the first adjustment element 34, and a vertical part 372 that extends downward from the right end portion of this horizontal part 371 and is connected to the second horizontal part 322 of the FM antenna body 32. Accordingly, in this example, the first power supply part 31 is connected to the FM antenna body 32, via the first adjustment element 34. The receiver sensitivity can be improved, even if the first adjustment element 34 has such a shape.

Here, in the case where the impedance of the design value is set to 75Ω, for example, as described above, the optimal value of the length of the turned back part 324 of the first horizontal part 321 is preferably 50 mm to 250 mm, more preferably 100 mm to 200 mm, and particularly preferably 120 mm to 160 mm. On the other hand, the length of the second horizontal part 344 of the first adjustment element 34 is not particularly limited, and can be from 200 mm to 300 mm, for example. Also, the optimal value of the distance between the turned back part 324 and the second horizontal part 344 is preferably 5 mm to 30 mm, more preferably 5 mm to 20 mm, and particularly preferably 7 mm to 12 mm.

(5) Since an FM sub-antenna is provided, the receiver sensitivity and directivity of FM broadcast waves can be improved. That is, the energy for FM received with the FM antenna body 32 can be appropriately divided between the first power supply part 31 side (main side) and the second power supply part 35 side (sub side). As a result, when the sensitivity decreases on the main side in the valley between buildings, for example, the decrease in sensitivity can be supplemented with the sub side. Also, in the present embodiment, the second power supply part 35 is provided on the opposite side to the first power supply part 31 and the sub power supply element 36 extends therefrom as the FM sub-antenna, but since the FM antenna body 32 is shaped as described above and space is secured on the right side thereof, the sub power supply element 36 can be efficiently capacitively coupled to the first horizontal part 321. The sub power supply element 36 can also be capacitively coupled to the second horizontal part 322.

(6) In the above embodiment, since the FM antenna 3 is for dual use as an antenna AM, the number of power supply parts can be reduced. Note that the AM antenna can also be provided separately.

B. Second Embodiment

Figure 3:
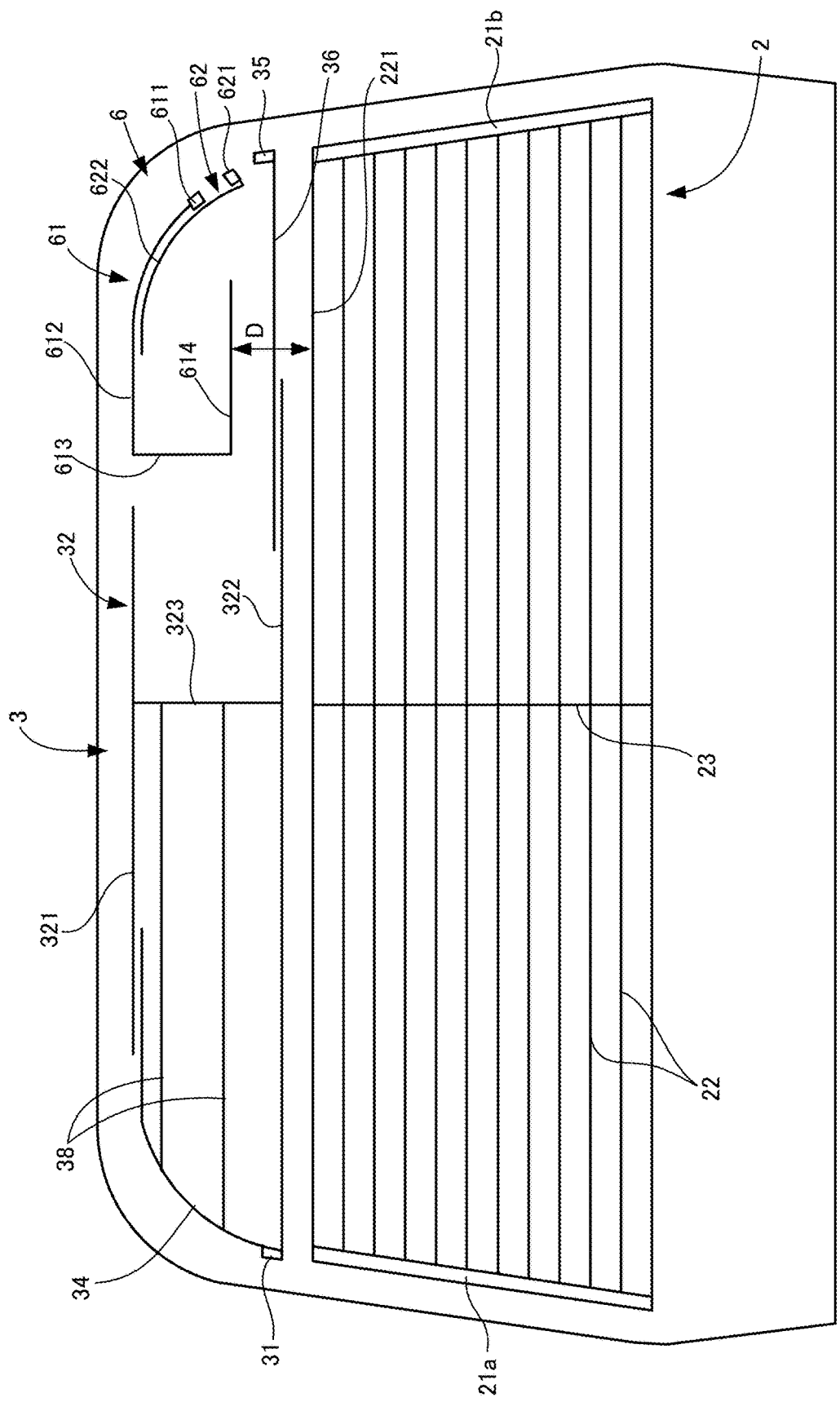
FIG. 3 is a front view of a rear glass of an automobile serving as a second embodiment of the vehicle window glass according to the present invention.

Next, a second embodiment of the vehicle window glass according to the present invention will be described, with reference to FIG. 3. FIG. 3 is a front view of the rear glass of an automobile to which the vehicle window glass according to the present embodiment is applied. Hereinafter, only the differences from the first embodiment will be described. In the second embodiment, the shape of the FM/AM dual band antenna 3 is different from the first embodiment and, also, a DAB antenna 6 is disposed instead of a digital television antenna. Furthermore, a second adjustment element is not provided. Hereinafter, the differences will be described.

1. FM/AM Dual Band Antenna

As shown in FIG. 3, the FM/AM dual band antenna 3 according to the present embodiment differs in the shape of the FM antenna body, the power supply element, the first adjustment element, the main power supply element, and the sub power supply element of the FM sub-antenna. Hereinafter, these parts will be described.

1-1. FM Antenna Body

First, the FM antenna body 32 of the present embodiment, similarly to the first embodiment, has a first horizontal part 321, a second horizontal part 322 that extends in parallel with this first horizontal part 321, and a vertical part 323 that joins the middle of the first horizontal part 321 to the middle of the second horizontal part 322 and extends in the up-down direction. A difference from the first embodiment is with the second horizontal part 322. The second horizontal part 322 according to the present embodiment is connected at the end portion on the left side to the first power supply part 31. Also, the right side of the second horizontal part 322 is formed to be slightly shorter than in the first embodiment.

1-2. First Adjustment Element

The first adjustment element 34 is constituted as follows. The first adjustment element 34 of the present embodiment is formed so as to extend upward along the left end edge of the glass plate 1 from the first power supply part 31, and to extend in the horizontal direction from the vicinity of the upper end of the glass plate 1. The horizontal portion of the upper end of the first adjustment element 34 is adjacent to the lower side of the first horizontal part 321 of the FM antenna body 32, and extends horizontally along this first horizontal part 321. The first adjustment element 34 is thereby capacitively coupled to the first horizontal part 321 of the FM antenna body 32.

1-3. Power Supply Elements

In the present embodiment, two third main power supply elements 38 are connected to an intermediate part of the first adjustment element 34. These third main power supply elements 38 are disposed in parallel with each other, and the right end portions thereof are each connected to the vertical part 323 of the FM antenna body 32.

1-4. Sub Power Supply Element

The sub power supply element 36 is constituted as follows. The sub power supply element 36 according to the present embodiment extends linearly on the left side from the second power supply part 35, and is adjacent to and extends along the upper side of the second horizontal part 322 of the FM antenna body 32.

2. DAB Antenna

Next, the DAB antenna will be described. DAB is a digital radio broadcasting standard that is employed in Europe and elsewhere. In DAB, band 3 having a frequency band of 174 MHz to 240 MHz and L band having a frequency band of 1452 MHz to 1492 MHz are mainly used. In the present embodiment, a DAB antenna 6 whose main frequency band is band 3 is targeted.

The DAB antenna 6 according to the present embodiment is constituted by an antenna body element 61 and a ground connection element 62. The antenna body element 61 includes a DAB power supply part 611 provided in the vicinity of the upper right corner of the glass plate 1, and a first part 612 that extends therefrom toward the left side along the upper end edge of the glass plate 1. This first part 612 extends, in the horizontal direction, to slightly to the right side of the right end portion of the first horizontal part 321 of the FM antenna body 3, and a second part 613 that extends downward is connected to the right end portion of this first part 612. The second part 613 extends to slightly upward of the sub power supply element 36, and a third part 614 that extends to the vicinity of the right side edge of the glass plate 1 in the left-right direction is connected to a lower end portion of this second part 613.

A third part 614 is positioned as the lowermost part of the DAB antenna 6, and a distance D between this third part 614 and the uppermost horizontal heating wire 221 of the defogger 2 is, for example, preferably 5 to 100 mm, and more preferably 5 to 60 mm. This is because the second part 613, which is the vertical element of the DAB antenna 6, will be shortened in length when the distance D increases. To be more specific, since the element length in the vertical direction greatly affects the receiver sensitivity in the DAB antenna 6, there is a risk that shortening the length of the second part 613 will lead to a decrease in the sensitivity of the DAB antenna 6. On the other hand, there is a risk that the defogger 2 and the DAB antenna 6 will become capacitively coupled when the distance D is smaller than 5 mm, and the distance D is preferably larger than 5 mm in order to prevent this.

On the other hand, the ground connection element 62 includes a ground connection part 621 and a linear main body part 622 that extends upward therefrom. The ground connection part 621 is disposed slightly downward from the DAB power supply part 611, and the main body part 622 extends along the first part 612 of the antenna body element 61, slightly to the left side of the first part 612, and extends to near the second part 613.

Also, a DAB receiver (illustration omitted) is provided in the automobile, and the DAB power supply part 611 is connected to an inner conductor of a coaxial cable (illustration omitted) connected to this receiver. On the other hand, the ground connection part 621 is electrically connected to an outer conductor of the coaxial cable and is grounded.

3. Features

As described above, according to the present embodiment, the following effects can be obtained.

(1) The basic shape of the FM antenna body 32 is the same as the first embodiment, but, in the present embodiment, since another antenna is not disposed on the left side of the FM antenna body 32, there is a high degree of freedom for wiring in the space on the left side of the FM antenna body 32. That is, the adjustment element 34 and the two third main power supply elements 38 can be disposed across generally the entirety of this space. Thus, in the case where the FM antenna is shared with the AM antenna, as in the present embodiment, the disposition area of the antenna can be enlarged, enabling the receiver sensitivity of the AM antenna to be improved.

(2) Also, the space on the right side of the FM antenna body 32 is secured as another antenna space, similarly to the first embodiment, and, in the present embodiment, thus serves as the disposition space of the DAB antenna 6. In particular, since the sub power supply element 36 of the FM sub-antenna is formed generally linearly toward the right side from the second power supply part 35, a large space can be secured on the right side of the FM antenna body 32. Note that a digital television antenna may also be disposed in this space.

C. Third Embodiment

Figure 4:
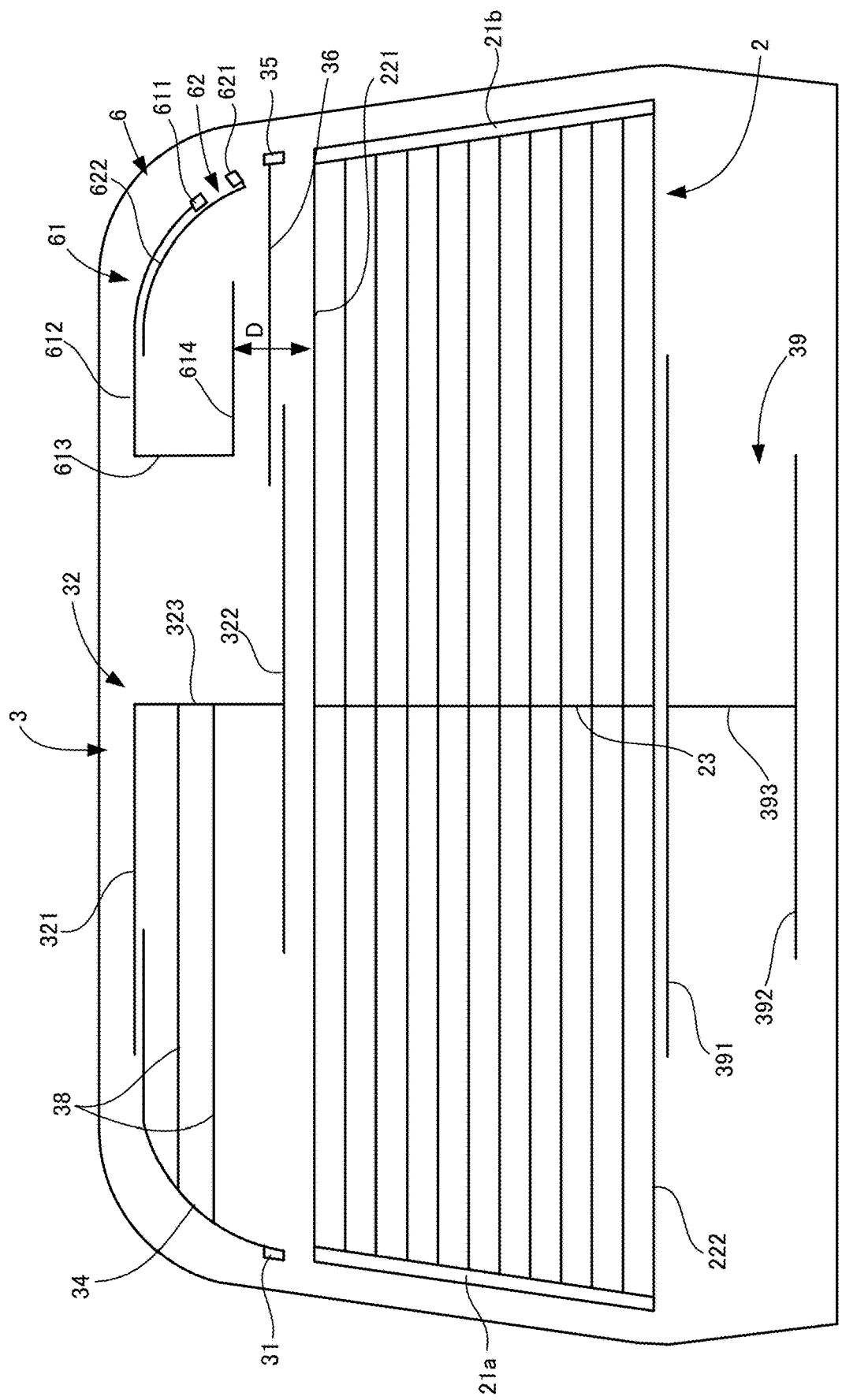
FIG. 4 is a front view of a rear glass of an automobile serving as a third embodiment of the vehicle window glass according to the present invention.

Next, a third embodiment of the vehicle window glass according to the present invention will be described, with reference to FIG. 4. FIG. 4 is a front view of the rear glass of an automobile to which the vehicle window glass according to the present embodiment is applied. Hereinafter, only the differences from the second embodiment will be described. In the third embodiment, the shape of the FM/AM dual band antenna 3 differs and, also, the second adjustment element 39 is provided on the lower side of the defogger 2. This second adjustment element, however, differs in shape from that of the first embodiment. Note that since the first adjustment element 34 is the same as in the second embodiment, description thereof is omitted.

1. FM/AM Dual Band Antenna

In the FM/AM dual band antenna 3 according to the present embodiment, the right end portion of the first horizontal part 321 of the FM antenna body 32 is connected to the upper end of the vertical part 323. That is, the first horizontal part 321 and the vertical part 323 form an L-shape. A large space is thereby secured on the upper right of the glass plate 1. Also, the right end portion of the second horizontal part 322 of the FM antenna body 32 is formed by a straight line. Furthermore, the sub power supply element 36 of the FM sub-antenna is also formed by a straight line, and is disposed so as to extend along the upper side of the second horizontal part 322 of the FM antenna body 32. At this time, the amount by which the second horizontal part 322 and the sub power supply element 36 overlap in the right-left direction is shorter than in the second embodiment. For example, the length of overlap can be set to approximately 20 to 50% compared with the second embodiment. Specifically, when the length of overlap in the second embodiment is set to 175 mm, the length of overlap in the third embodiment can be set to 50 mm.

2. Second Adjustment Element

The second adjustment element 39 is provided with a first horizontal part 391 that extends directly below and in parallel with the lowermost horizontal heating wire 222 of the defogger 2, a second horizontal part 392 that extends in the left-right direction downward of this first horizontal part 391, and a vertical part 393 that links both these horizontal parts 391 and 392. The first horizontal part 391 is approximately half the length of the defogger 2 in the horizontal direction, and the second horizontal part 392 is formed to be even shorter. Also, the second horizontal part 392 is disposed in the vicinity of the lower edge of the glass plate 1. The vertical part 393 is disposed in a position corresponding to the vertical wire 23 of the defogger 2.

3. Features

The present embodiment, in particular, is able to reduce the influence exerted on the receiver sensitivity of FM broadcast waves by the headrest of the backseat of an automobile. That is, the headrest is fixed by a metal rod-like member so as to be slidable along the upper end portion of the backseat, and the rod-like member also moves upward and is exposed when the headrest is raised, thus weakening the receiver sensitivity of FM broadcast waves. Specifically, as a result of the FM/AM dual band antenna 3 being high-frequency coupled to an LC series resonant circuit that is constituted by the headrest and the seat frame, radio waves that should originally be received with the FM/AM dual band antenna 3 were trapped by the headrest, causing an antenna sensitivity "dip". In particular, the receiver sensitivity of FM broadcast waves decreased, due to an L value of the LC series resonant circuit changing as a result of the headrest being raised, and a dip frequency in which the receiver sensitivity decreases moving from out-of-band to in-band. In view of this, in the present embodiment, the influence of the headrest is reduced, by changing the shape of the FM/AM dual band antenna 3 from the second embodiment and further providing the second adjustment element 39, as described above. Specifically, the following measures (1) to (3) were applied.

(1) By providing the second adjustment element 39, capacitive coupling between the FM antenna body 32 and the defogger 2 was strengthened.

(2) The first power supply part 31 and the second horizontal part 322 of the FM antenna body 32 were not connected, and the vertical part 323 and the second horizontal part 322 were connected in a reverse T-shape. By disposing the second horizontal part 322 to oppose the defogger 2, capacitive coupling with the defogger 2 was strengthened.

(3) The length of overlap in the left-right direction between the second horizontal part 322 of the FM antenna body 32 and the sub power supply element 36 was shortened, and capacitive coupling between the FM antenna body 32 and the sub power supply element 36 was weakened.

Note that the influence of the headrest can be reduced by implementing even one of the above measures (1) to (3).

D. Variations

Embodiments of the present invention have been described above, but the present invention is not limited to the foregoing embodiments, and various changes can be made without departing from the spirit of the invention. Note that the following variations can be combined as appropriate.

[1] The form of the defogger 2 of the above embodiments is illustrative, and the number of heating wires 22, the number of vertical wires, the numbers of intersections thereof and the like are not particularly limited. Also, in order to improve the receiver sensitivity, additional elements can also be provided as appropriate.

[2] The forms of the FM/AM dual band antenna 3, the digital television antennas 4 and 5 and the DAB antenna 6 in the above embodiments are illustrative, and the number, length, direction and the like of the elements are not particularly limited. Also, the numbers of digital television antennas and DAB antennas are not particularly limited, and one or a plurality of these antennas may be provided.

[3] In the above embodiments, the main power supply elements 33 and 38 are connected to the second horizontal part 322 or the vertical part 323 of the FM antenna body 32, but the main power supply elements 33 and 38 can also be connected to the first horizontal part 321. In this case, the adjustment element is capacitively coupled to another part of the FM antenna body.

[4] The adjustment elements 34 and 39 are not necessarily required, and need only be provided if needed.

Figure 5:
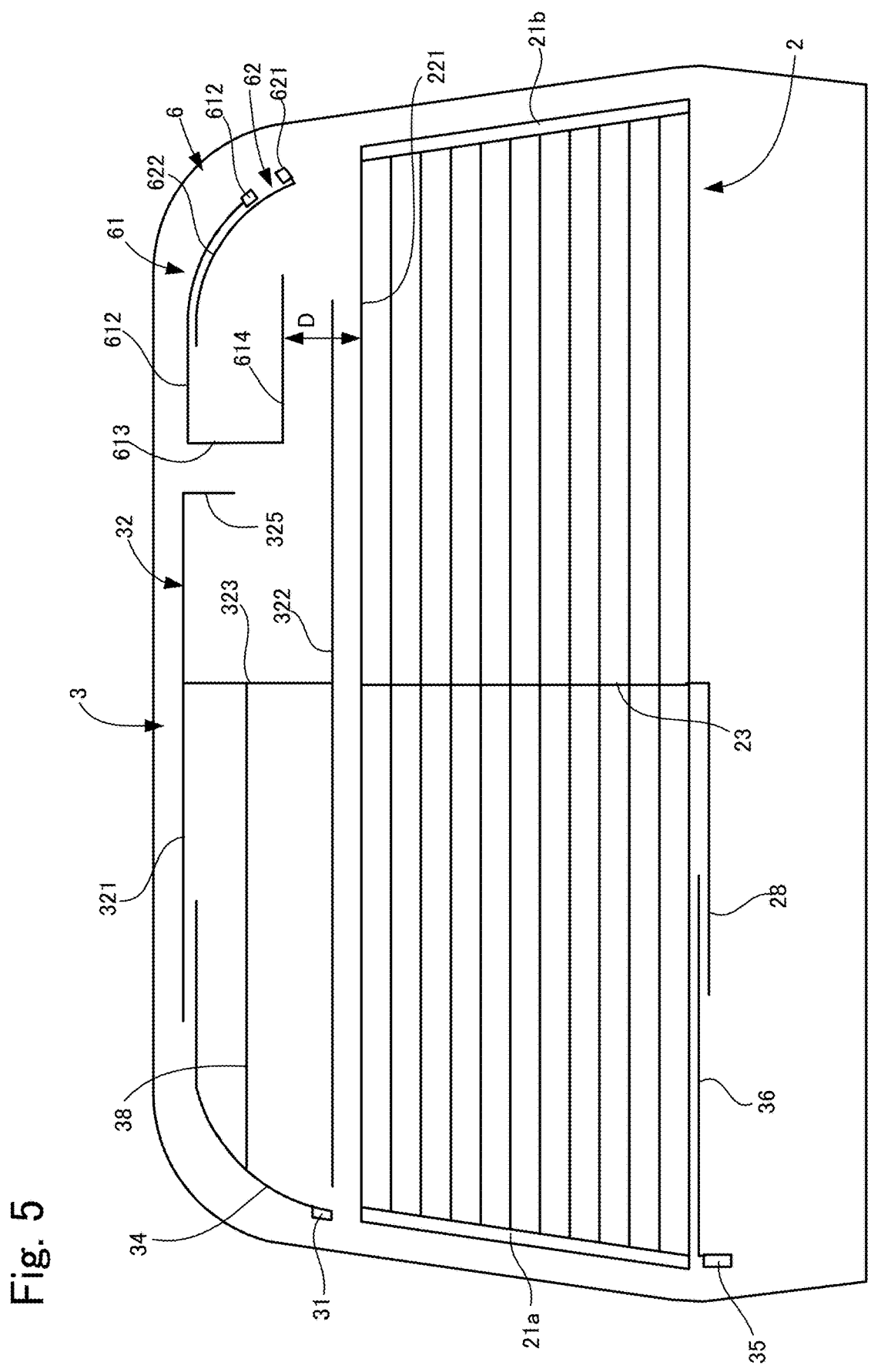
FIG. 5 is a front view of a rear glass showing another example of FIG. 3.

[5] The FM sub-antenna is not particularly limited in terms of location, and may be disposed on the lower side of the defogger 2. An example regarding this point will be illustrated, with reference to FIG. 5. FIG. 5 is a front view of the rear glass of an automobile to which the vehicle window glass in this example is applied. In this example, the shape of the FM main antenna is different from the second embodiment and, also, the FM sub-antenna is provided on the lower side of the defogger. Hereinafter, this configuration will be described.

5-1. FM Main Antenna

In the FM main antenna shown in FIG. 5, a short second vertical part 325 that extends on the lower side is linked to the right end portion of the first horizontal part 321 of the FM antenna body 32. Also, the right end portion of the second horizontal part 322 is formed linearly. Furthermore, the two main power supply elements provided in the second embodiment have been reduced to one.

5-2. FM Sub-Antenna and Defogger

The FM sub-antenna shown in FIG. 5 is provided on the lower side of the defogger 2. That is, the second power supply part 35 is provided directly under the defogger 2 on the left side edge of the glass plate 1. The sub power supply element 36 extends along the lowermost horizontal heating wire 222 of the defogger 2 from the second power supply part 35. Also, an L-shape extension wire 28 is provided on the lower end portion of the vertical wire 23 of the defogger 2. That is, this extension wire 28 extends downward from the lower end portion of the vertical wire 23, and further extends in the horizontal direction toward the left side. The horizontal portion of this extension wire 28 extends on the lower side of and along the sub power supply element 36. Note that this extension wire 28 is equivalent to the second adjustment element 39 of the above embodiments.

As described above, the FM sub-antenna is not particularly limited in terms of location, and can be disposed in various places such as the lower right end portion of the glass plate 1. The FM main antenna is also not particularly limited in terms of disposition location.

WORKING EXAMPLES

Hereinafter, working examples of the present invention will be described. The present invention is, however, not limited to the following working examples.

1. Length of Capacitive Coupling Between FM Antenna Body and Adjustment Element

Figure 6:
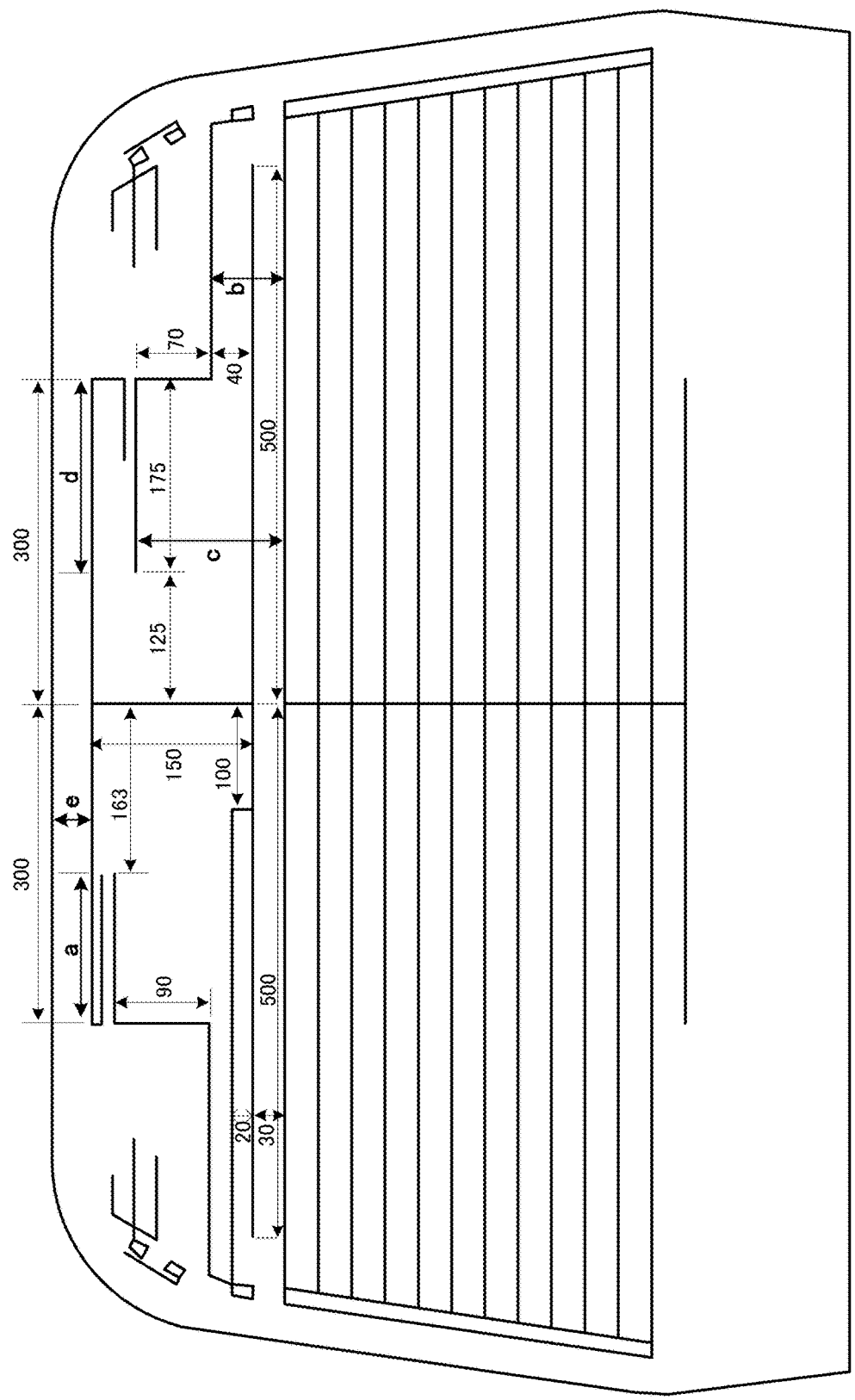
FIG. 6 is a front view of the rear glass of an automobile showing working examples 1 and 2.

The length of the overlapping portion of the first horizontal part of the FM antenna body and the adjustment element, or in other words, a length a of capacitive coupling, in the vehicle window glass shown in the first embodiment was investigated. Here, a working example 1 in which the length a was 200 mm in FIG. 6 and a working example 2 in which the length a was 150 mm in FIG. 6 were prepared. Note that the unit of the numerical values in FIG. 6 is millimeters (the same applies to other diagrams).

The reception performance of the FM frequency band (76 to 108 MHz) in the FM main antenna was measured as follows using these working examples 1 and 2.

That is, having mounted the window glass according to each of the above working examples in an automobile, radio waves (vertically polarized waves, horizontally polarized waves, obliquely polarized waves, etc.) were emitted onto the vehicle, and sensitivity was measured. Measurement was carried out under the following conditions.

Installation angle of window glass with antenna mounted: 23 degree angle to horizontal.

Angular resolution: measured while rotating automobile 360 degrees every angle of 3 degrees (or 5 degrees).

Elevation angle between transmit position of radio waves and antenna: 1.7 degrees (ground, horizontal direction=0 degrees; zenith direction=90 degrees)

Note that this measurement method was similarly applied in the working examples described later.

Figure 7:
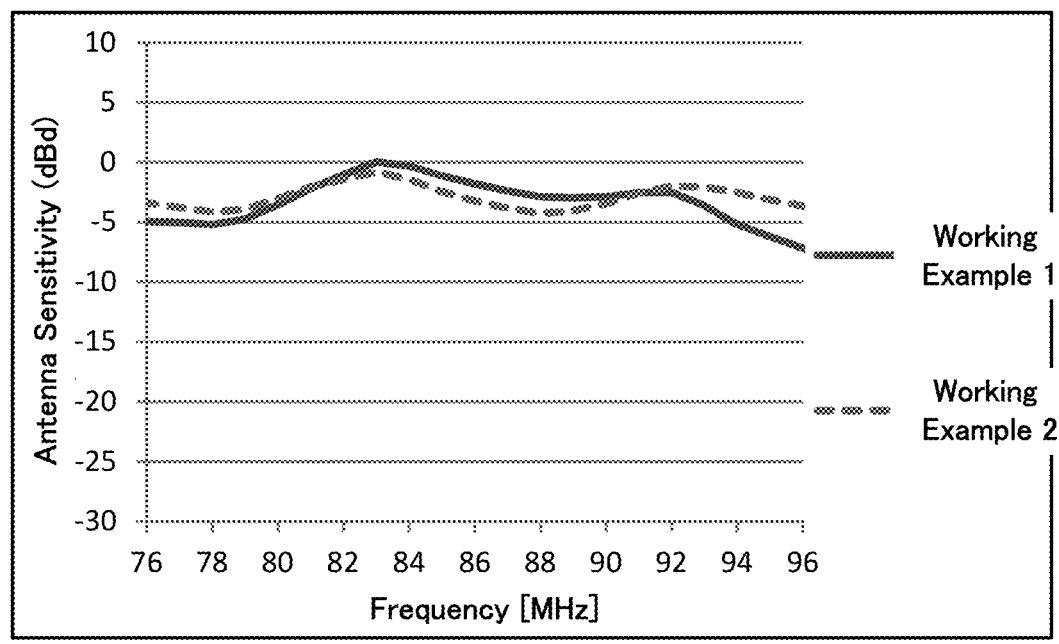
FIG. 7 is a graph showing the relationship between frequency and antenna sensitivity of an FM main antenna in the working examples 1 and 2.

The results are as shown in FIG. 7. As shown in FIG. 7, when the length a of capacitive coupling was long, the receiver sensitivity in the 82 to 90 MHz frequency range improved, whereas the receiver sensitivity in the 70 to 82 MHz frequency range was high when the length a of capacitive coupling was short. Note that, in the graph of FIG. 7, the vertical axis is normalized, such that the maximum value of in-band antenna sensitivity will be 0 dBd. This similarly applies to FIGS. 8 to 11 and FIG. 13 described later.

2. Distance 1 Between Sub Power Supply Element and Defogger

With the window glass shown in FIG. 6, a working example 3 in which a distance b between the first horizontal part of the sub power supply element and the defogger was 40 mm and a working example 4 in which the distance b was 60 mm were prepared. In this case, the length of the second vertical part (reference sign 363 in FIG. 1) of the sub power supply element is changed. The receiver sensitivity of the FM main antenna and the FM sub-antenna was measured for these working examples. The results are as shown in FIG. 8. That is, it was revealed that the receiver sensitivity in the FM main antenna improves across the entire frequency range when the distance b is lengthened. On the other hand, the receiver sensitivity in the FM sub-antenna was slightly higher in a frequency range higher than approximately 84 MHz when the distance b was shorter.

3. Distance 2 Between Sub Power Supply Element and Defogger

With the window glass shown in FIG. 6, a working example 5 in which a distance c between the second horizontal part of the sub power supply element and the defogger was 170 mm, a working example 6 in which the distance c was 140 mm, and a working example 7 in which the distance c was 90 mm were prepared. In this case, the length of the second vertical part (reference sign 363 in FIG. 1) of the sub power supply element is changed. The receiver sensitivity of the FM main antenna and the FM sub-antenna was measured for these working examples. The results are as shown in FIG. 9. That is, it was revealed that the receiver sensitivity in the FM main antenna improves across the entire frequency range when the distance c is lengthened. On the other hand, the receiver sensitivity in the FM sub-antenna was slightly higher in a frequency range higher than approximately 86 MHz when the distance c was shorter.

4. Distance of Capacitive Coupling Between Sub Power Supply Element and FM Antenna Body With the window glass shown in FIG. 6, a working example 8 in which the length of overlap of the second horizontal part of the sub power supply element and the first horizontal part of the FM antenna body, that is, a length d of capacitive coupling, was 250 mm, a working example 9 in which the length d was 200 mm, and a working example 10 in which the length d was 150 mm were prepared. At this time, a turned back part (reference sign 324 in FIG. 1) on the right side of the first horizontal part of the FM antenna body was not provided. The receiver sensitivity of the FM main antenna and the FM sub-antenna was measured for these working examples. The results are as shown in FIG. 10. That is, it was revealed that the receiver sensitivity in the FM main antenna becomes higher in a frequency range of generally 82 MHz or higher as the distance d becomes longer. On the other hand, the receiver sensitivity in the FM sub-antenna was higher in a frequency range of generally 82 MHz or higher when the distance d was shorter.

5. Distance Between FM Antenna Body and Upper Edge of Glass Plate

Figure 11:
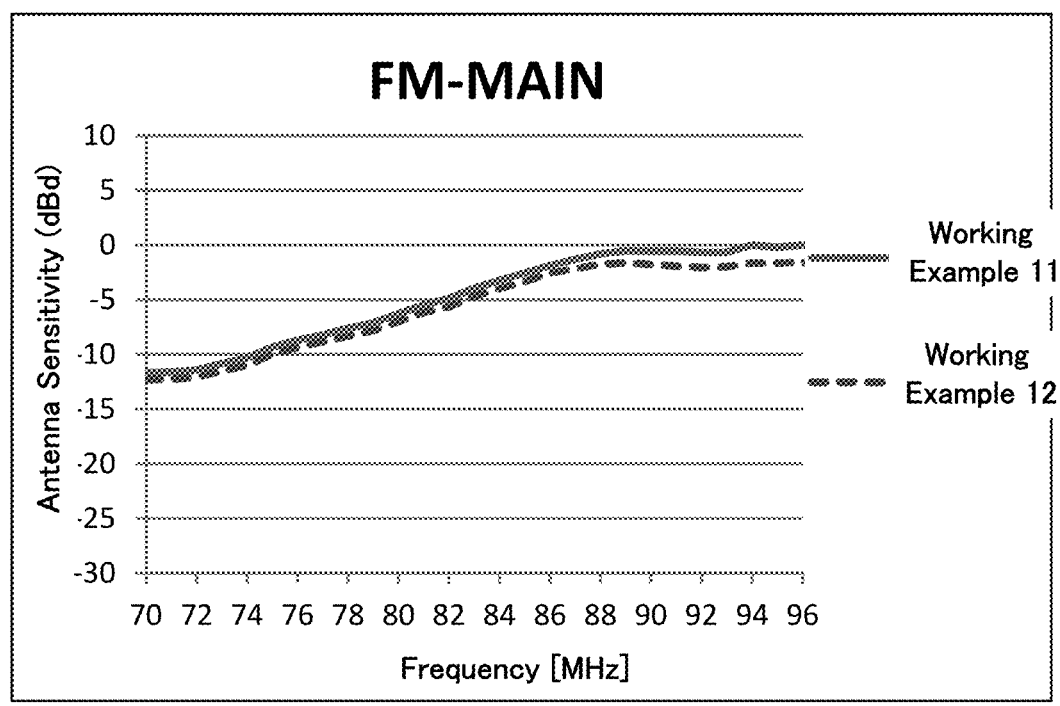
FIG. 11 is a graph showing the relationship between frequency and antenna sensitivity of an FM main antenna in working examples 11 and 12.

With the window glass shown in FIG. 6, a working example 11 in which a distance e between the first horizontal part of the FM antenna body and the upper edge of the glass plate was 30 mm and a working example 12 in which the distance e was 60 mm were prepared. The receiver sensitivity of the FM main antenna was measured for these working examples. The results are as shown in FIG. 11. That is, it was revealed that the receiver sensitivity improves slightly across the entire frequency range when the distance e is shortened.

6. Adjustment Element

Figure 12:
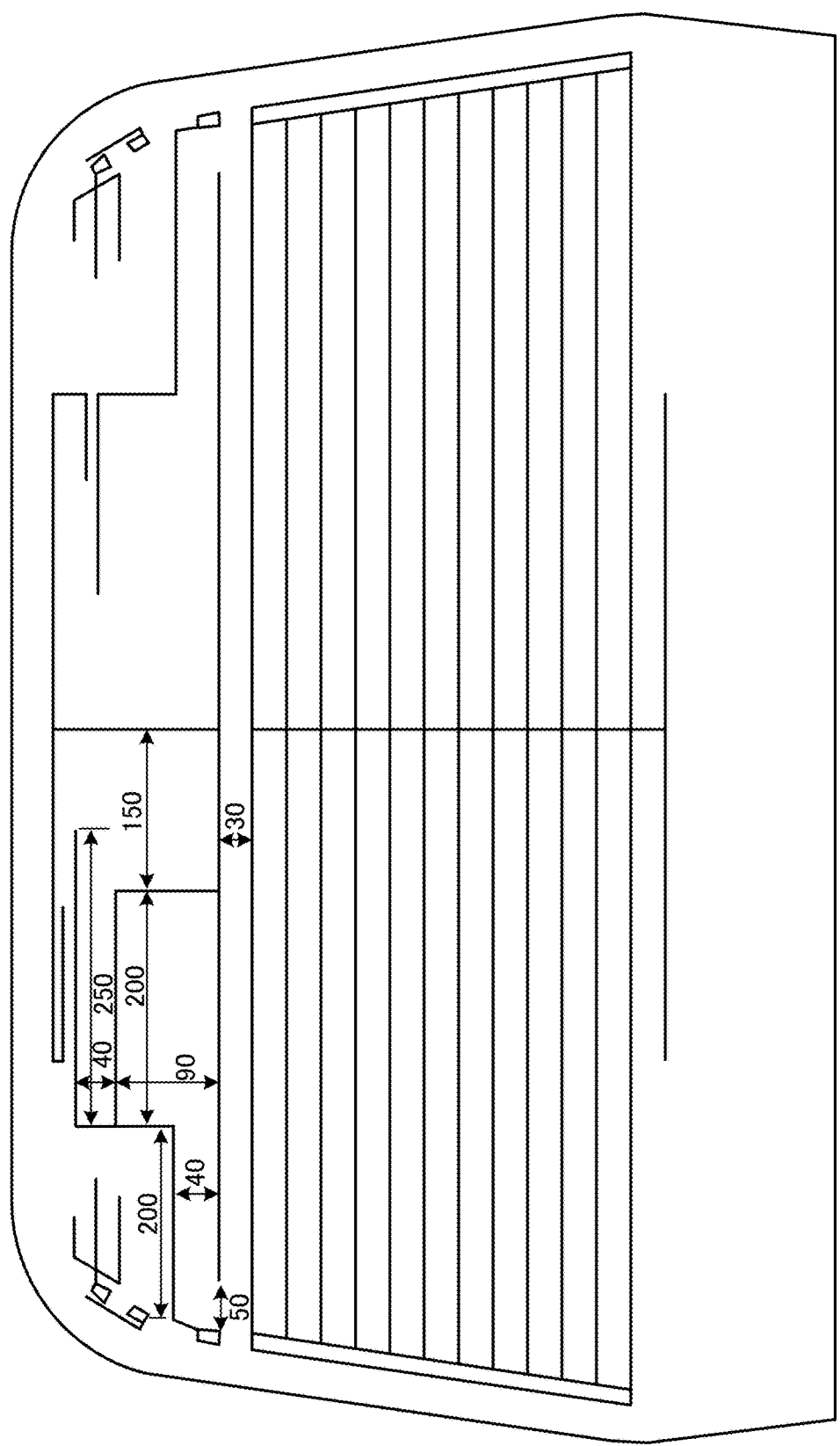
FIG. 12 is a front view showing working example 14.
Figure 13:
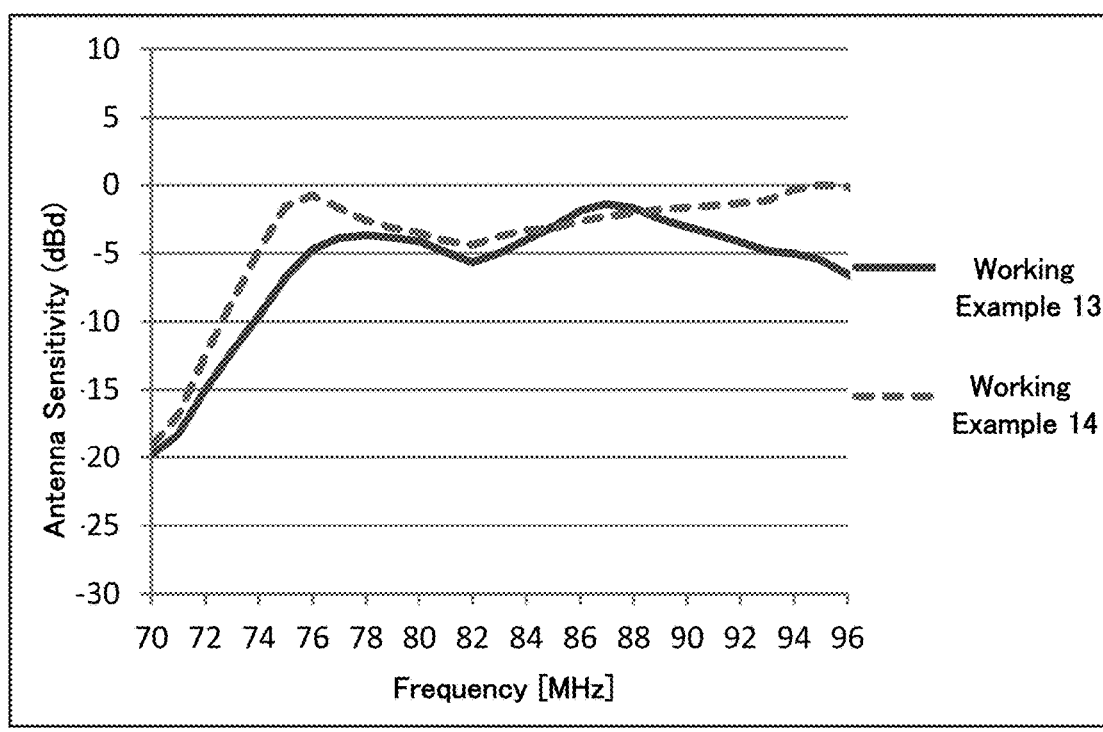
FIG. 13 is a graph showing the relationship between frequency and antenna sensitivity of an FM main antenna in working examples 13 and 14.

Taking the window glass shown in FIG. 6 as a working example 13 and the window glass shown in FIG. 12 as a working example 14, the receiver sensitivity of the FM main antenna was measured for these working examples. The results are as shown in FIG. 13. That is, the working example 14 had a higher receiver sensitivity over substantially all of the FM frequency range.

7. Countermeasures for Headrest

Figure 14:
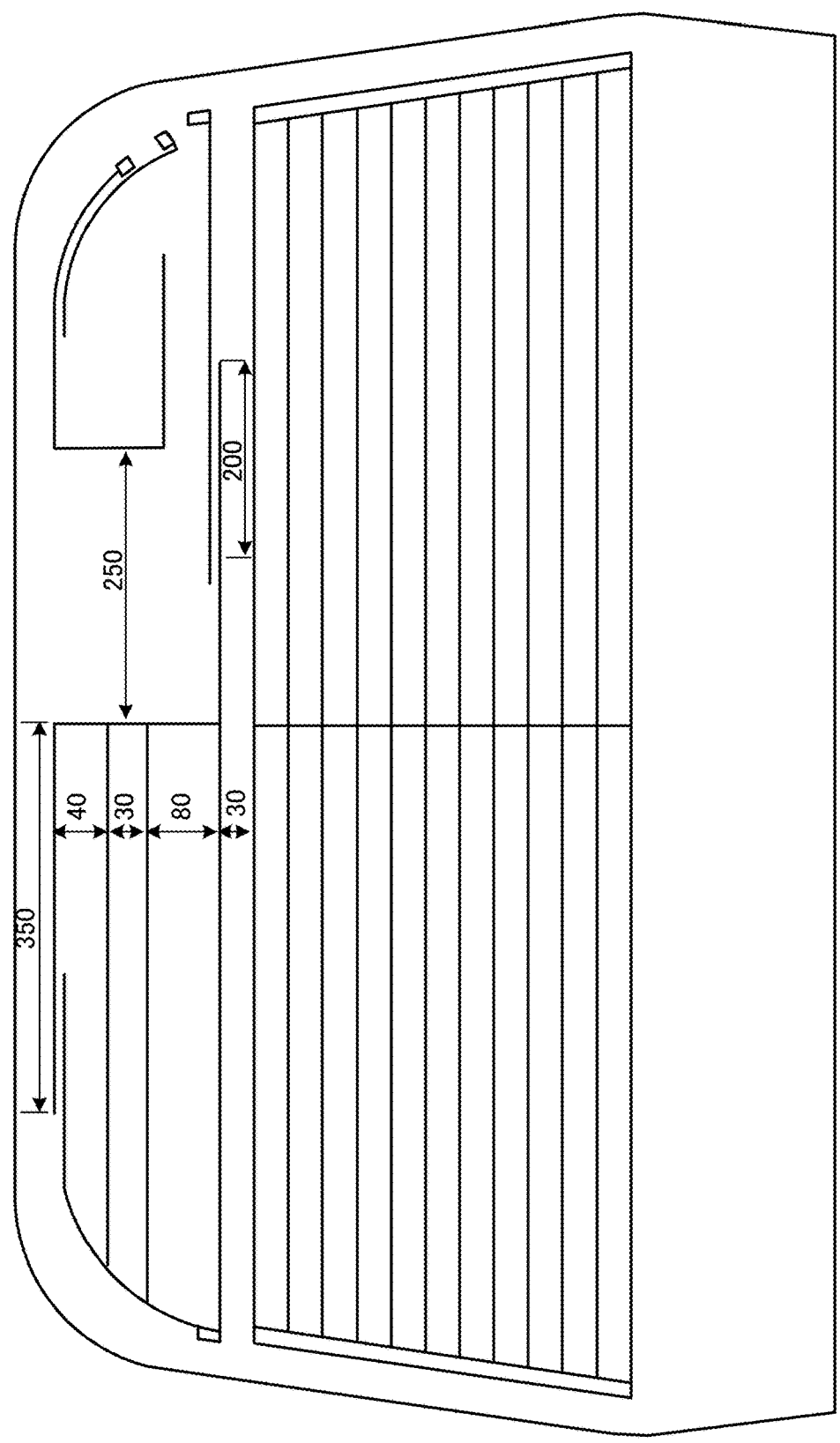
FIG. 14 is a front view showing working example 15.
Figure 15:
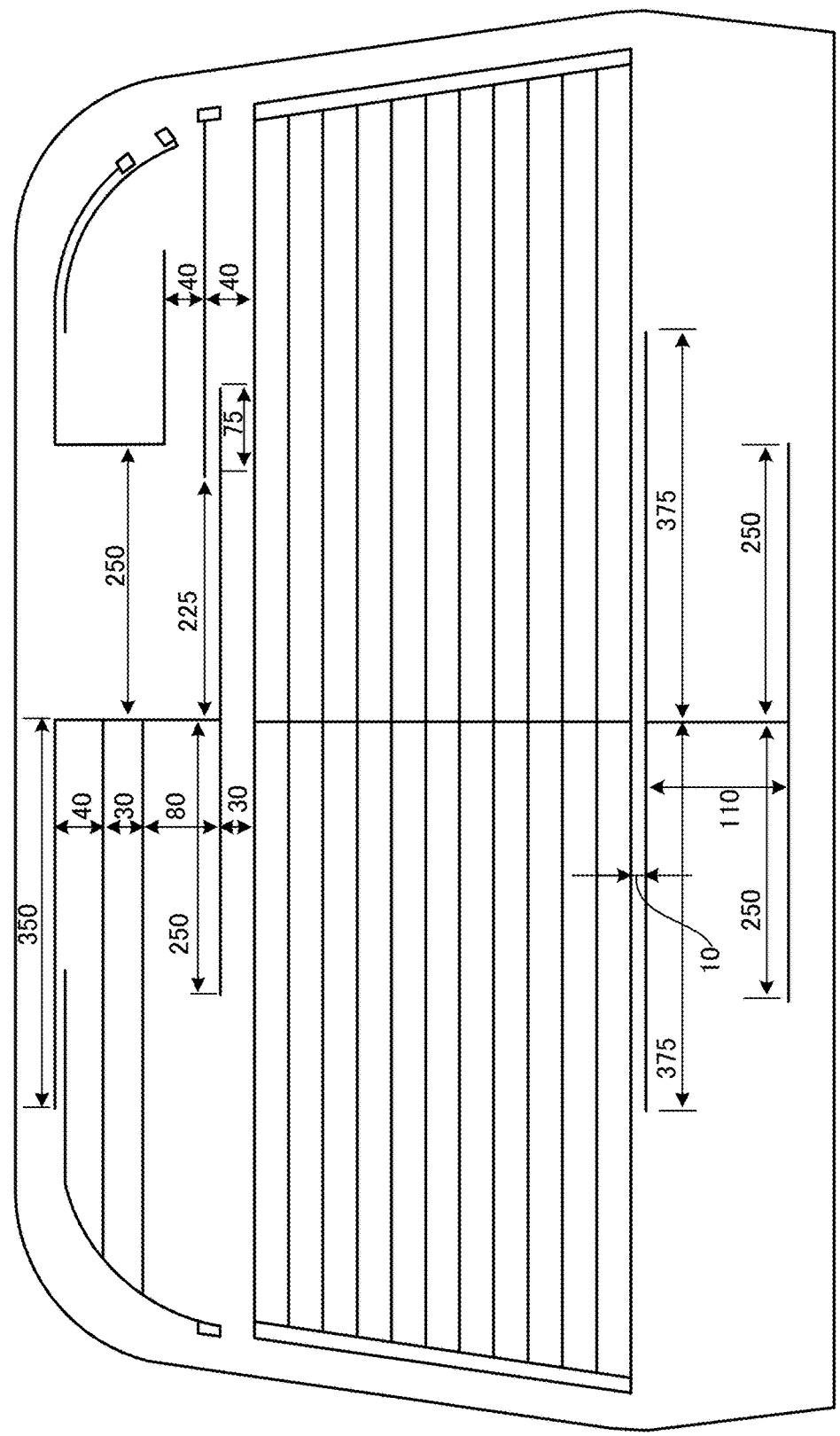
FIG. 15 is a front view showing working example 16.
Figure 16:
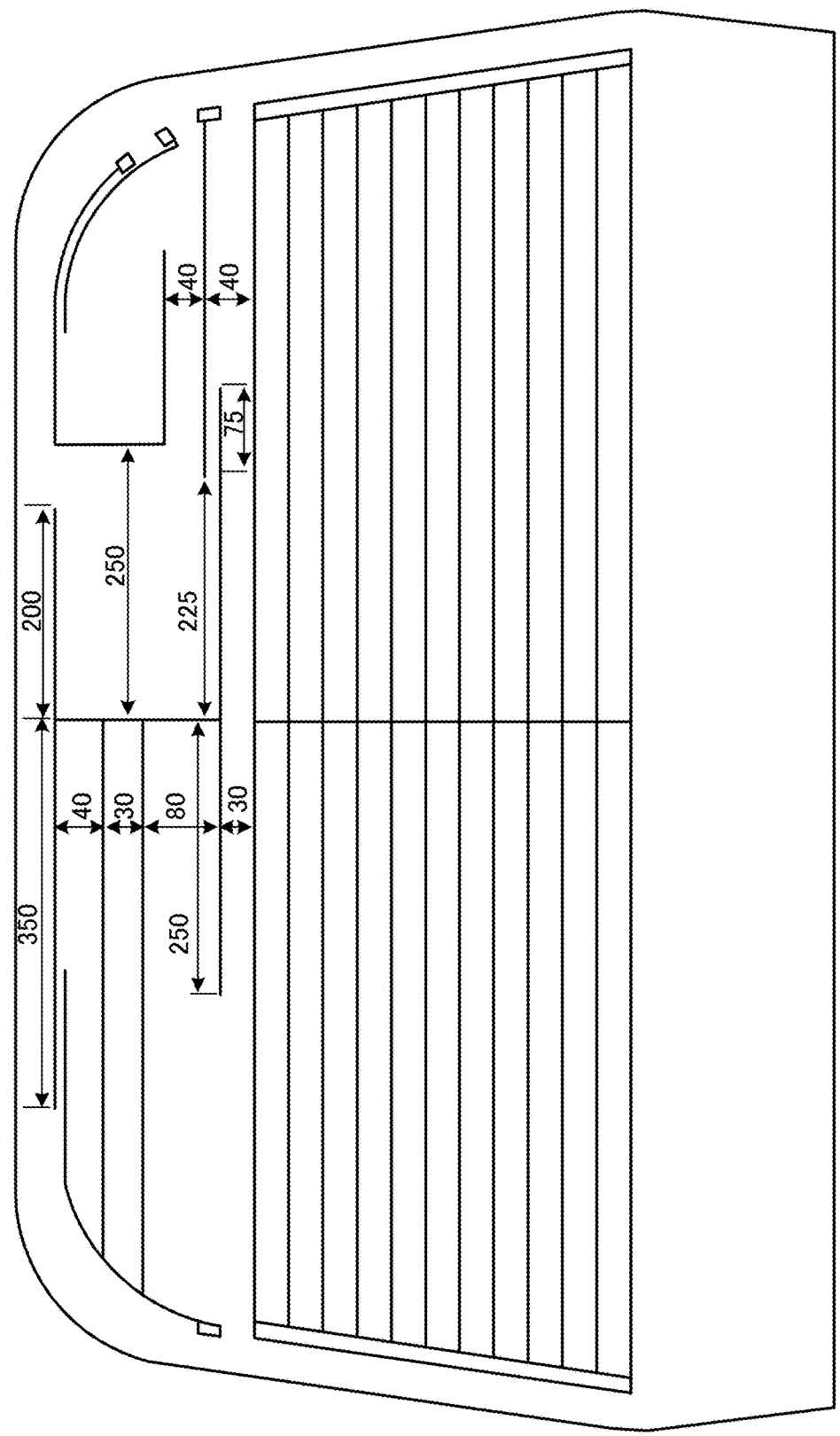
FIG. 16 is a front view showing working example 17.
Figure 17:
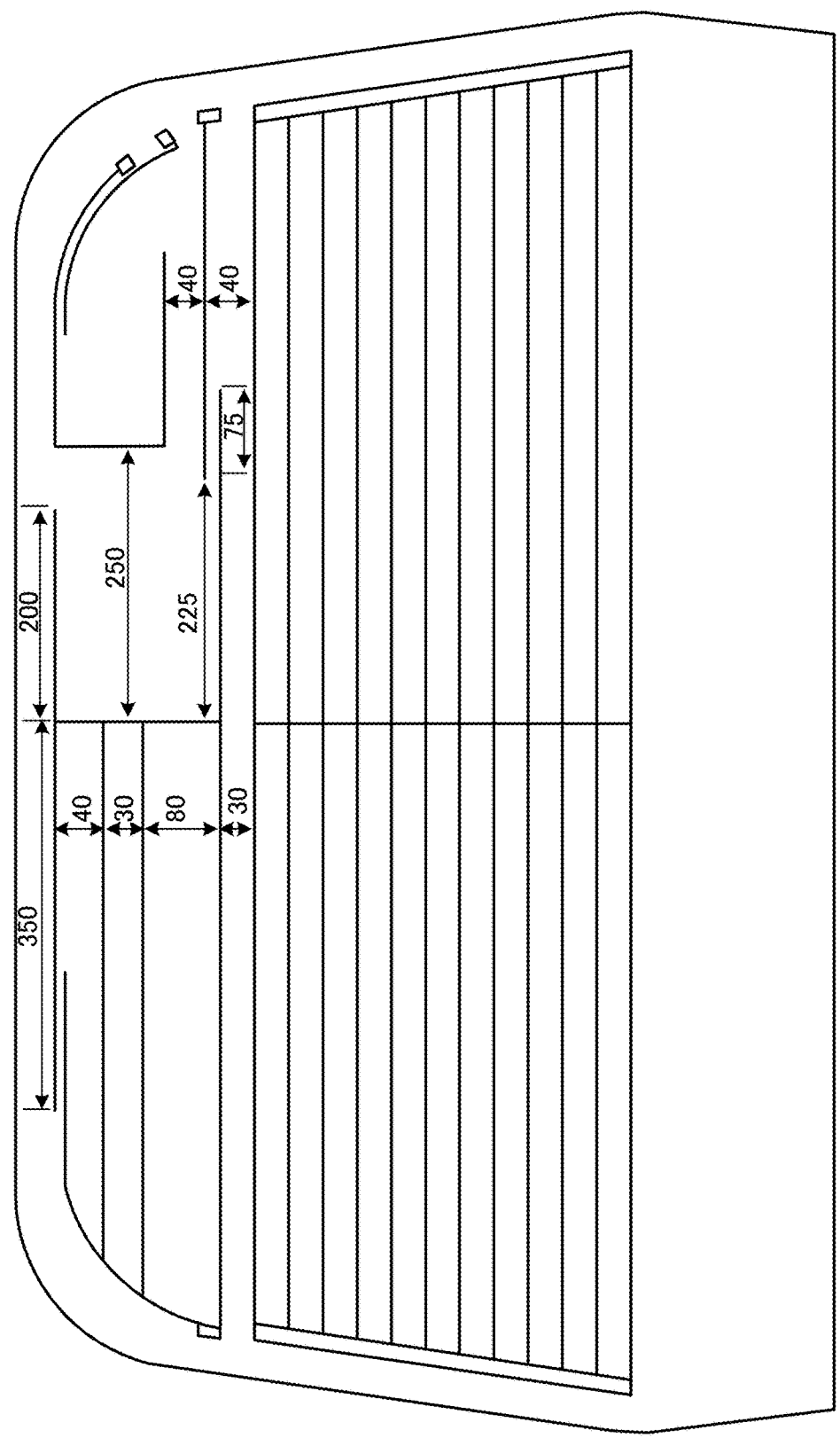
FIG. 17 is a front view showing working example 18.

FIG. 14 corresponding to the second embodiment was taken as a working example 15. Also, FIG. 15 corresponding to the third embodiment was taken as a working example 16. A mode of FIG. 16 in which the second adjustment element was removed from the window glass shown in the working example 16 and the first horizontal part of the FM antenna body extended on the right side was taken as a working example 17, and a mode of FIG. 17 in which the second horizontal part of the FM antenna body extended on the left side from this working example 17 and connected to the first power supply part was taken as a working example 18. That is, the working examples 16 to 18 each applied one or more of the measures (1) to (3) shown in the third embodiment.

The change in the receiver sensitivity of the FM main antenna and the FM sub-antenna between a position (reference position) in which the headrest of the backseat was not raised and a position (raised position) in which the headrest was raised and the rod-like member was exposed was measured for the working examples 15 to 18. At this time, the exposed length of the rod-like member of the headrest was approximately 60 mm. The results are as shown in the following Table 1.

TABLE 1

|  | FM Main Antenna | FM Sub-antenna |
| --- | --- | --- |
| Working Example 15 | 10 | 9 |
| Working Example 16 | 4 | 0 |
| Working Example 17 | 6 | 3 |
| Working Example 18 | 10 | 4 |

Table 1 shows the difference in receiver sensitivity in the vicinity of a frequency of 105 MHz between the headrest being in the reference position and the raised position. That is, the decrease in receiver sensitivity when moving from the reference position to the raised position is shown. The unit is dBd. In the working examples 16 to 18 to which measures for the headrest were applied, the decrease (difference between the reference position and the raised position) in receiver sensitivity, even with the headrest in the raised position, is generally small compared with the working example 15. Also, when the working examples 16 to 18 are compared, the decrease in receiver sensitivity in the raised position increases in order of the working examples 16, 17 and 18. Accordingly, the working example 16 to which all of the measures (1) to (3) shown in the third embodiment were applied was least likely to be affected by the headrest being raised, and the influence of raising the headrest increased as the measures were reduced.

8. Other Examples

Figure 18:
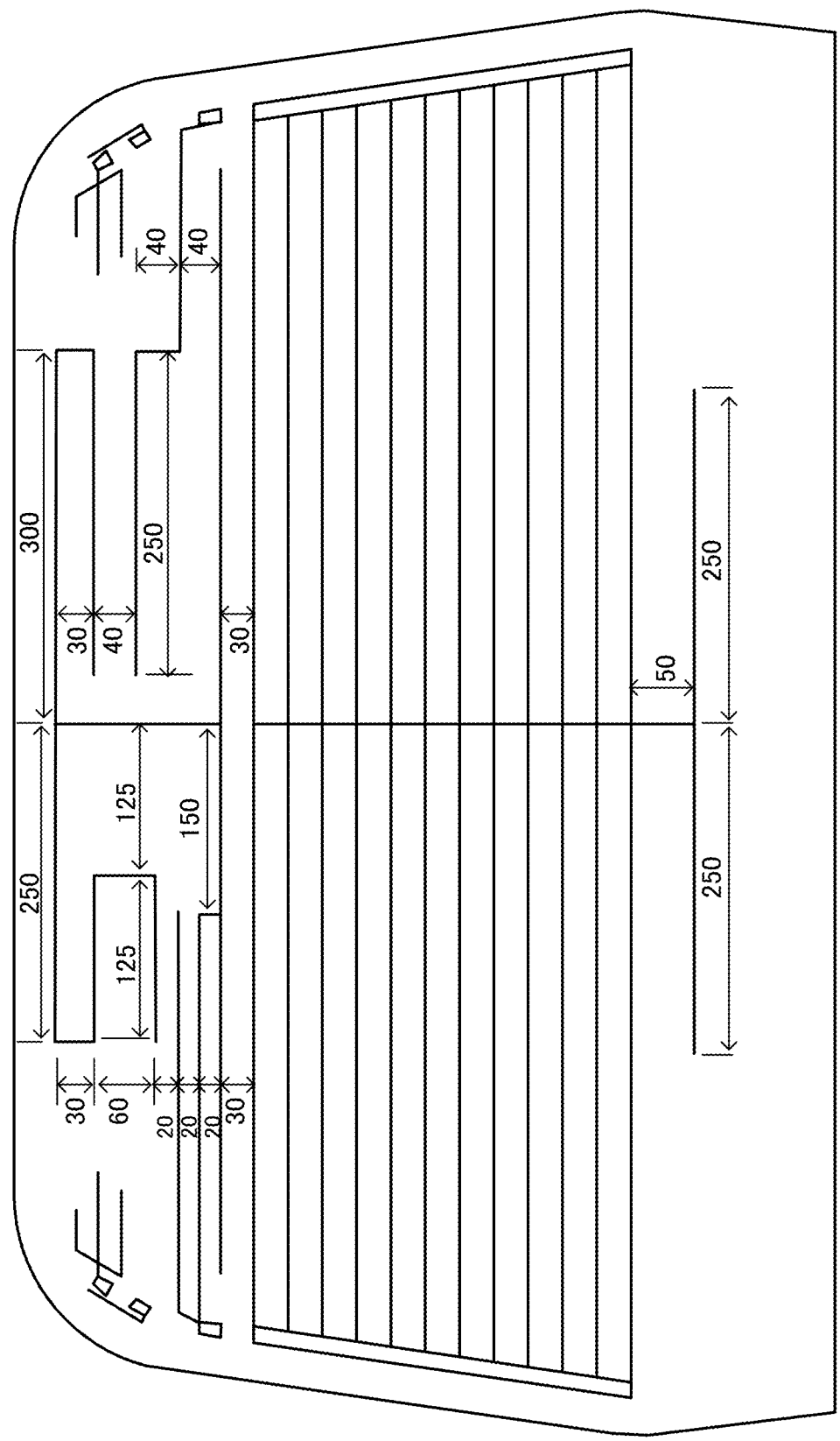
FIG. 18 is a front view showing working example 19.

A working example 19 obtained by transforming FIG. 1 was created. As shown in FIG. 18, the differences between this working example 19 and the form of FIG. 1 are as follows. Note that, for convenience of description, the reference signs given are the corresponding reference signs of the configuration of FIG. 1.

The first adjustment element 34 is constituted by only the first vertical part 341 and the first horizontal part 342, and the first horizontal part 342 is increased in length compared with FIG. 1 to be the same length as the first main power supply element 33.

The turned back part 324 on the left side of the first horizontal part 321 further has a vertical part that extends on the lower side, and a horizontal part that extends on the left side from this vertical part.

The turned back part 324 on the right side of the first horizontal part 321 is formed so as to extend greatly on the left side.

The second vertical part 363 of the sub power supply element 36 is short, and the second horizontal part 364 is the same length as the turned back part 324 on the right side of the first horizontal part 321.

The specific dimensions are as shown in FIG. 18.

The receiver sensitivity of the FM main antenna and the FM sub-antenna was measured for this working example 19. The results are as shown in FIG. 19. As shown in FIG. 19(*a*), the reception performance in the FM main antenna across the entire 76 to 95 MHz frequency range was favorable and did not exhibit a large drop, even compared with the other working examples. Similarly, as shown in FIG. 19(*b*), the reception performance in the FM sub-antenna was also favorable and did not exhibit a large drop.

REFERENCE SIGNS LIST

1 Glass plate
2 Defogger
3 FM/AM dual band antenna
4, 5 Digital television antenna
6 DAB antenna

The invention claimed is:

1. A vehicle window glass comprising:
a glass plate having a defogger region and an antenna region;
a defogger disposed in the defogger region and having a plurality of horizontal heating wires; and
an antenna including at least an FM antenna and disposed in the antenna region,
wherein the FM antenna includes:
a first power supply part disposed on the glass plate; and
an FM antenna body having a first horizontal part, a second horizontal part closer to the defogger than is the first horizontal part and at least one vertical part linking both the horizontal parts, and connected to the first power supply part;
a first adjustment element that extends from the first power supply part and is capacitively coupled to the first horizontal part of the FM antenna body; and
at least one main power supply element that extends from the first adjustment element and connects to the vertical part.

2. The vehicle window glass according to claim 1, wherein the FM antenna further includes:
a second power supply part; and
a sub power supply element that extends from the second power supply part and is capacitively coupled to the FM antenna body.

3. The vehicle window glass according to claim 2, wherein the sub power supply element is capacitively coupled to the first horizontal part of the FM antenna body.

4. The vehicle window glass according to claim 2, wherein the first power supply part is disposed at one end portion of the glass plate in a horizontal direction, and the second power supply part is disposed at the other end portion.

5. The vehicle window glass according to claim 1, wherein a distance between the FM antenna body and the defogger is 50 mm or less.

6. The vehicle window glass according to claim 1, wherein the FM antenna is configured so as to be shared with an AM antenna to which power is supplied from the first power supply part.

7. The vehicle window glass according to claim 1, wherein the antenna region includes a television antenna region on both sides of the first horizontal part of the FM antenna body, and
the vehicle window glass further comprises a pair of digital television antennas that are respectively disposed in the pair of television antenna regions.

8. The vehicle window glass according to claim 7, wherein a distance between the digital television antennas and the defogger is 50 mm or more.

9. The vehicle window glass according to claim 7, wherein each of the digital television antennas has a plurality of horizontal parts that extend in parallel with each other in the horizontal direction.

10. The vehicle window glass according to claim 9, wherein the plurality of horizontal parts differ in length.

11. The vehicle window glass according to claim 1, wherein the FM antenna further includes:
a second power supply part; and
a sub power supply element that extends from the second power supply part.

12. The vehicle window glass according to claim 11, wherein the sub power supply element is capacitively coupled to the second horizontal part of the FM antenna body.

13. The vehicle window glass according to claim 11, wherein the FM antenna further includes a second adjustment element that is disposed on an opposite side to the second horizontal part of the FM antenna body with the defogger sandwiched therebetween.

14. The vehicle window glass according to claim 13, wherein the second adjustment element has a first horizontal part that extends in parallel with the horizontal heating wires of the defogger, a second horizontal part that is disposed in a position further from the defogger than is the first horizontal part, and at least one vertical part that links both the horizontal parts.

15. The vehicle window glass according to claim 1, wherein the FM antenna further includes:
a second power supply part; and
a sub power supply element that extends from the second power supply part,
the second power supply part is disposed on an opposite side to the first power supply part with the defogger sandwiched therebetween, and
the sub power supply element is disposed on an opposite side to the FM antenna body with the defogger sandwiched therebetween and is capacitively coupled to the defogger.

16. The vehicle window glass according to claim 1, wherein, in the FM antenna body, an end portion of the first horizontal part on an opposite side to the first power supply part is connected to an end portion of the vertical part.

17. The vehicle window glass according to claim 1, wherein the at least one main power supply element includes a plurality of main power supply elements, and each of the plurality of main power supply elements extends from the first adjustment element and connects to the vertical part.

* * * * *